United States Patent [19]
Gerber et al.

[11] Patent Number: 5,596,917
[45] Date of Patent: Jan. 28, 1997

[54] APPARATUS FOR CONVEYING AND CUTTING SHEET MATERIAL ON A VACUUM BED WITH SYSTEM FOR SEALING END PORTIONS OF THE BED

[75] Inventors: H. Joseph Gerber, West Hartford; Richard Kuchta, Tolland, both of Conn.

[73] Assignee: Gerber Garment Technology, Inc., Tolland, Conn.

[21] Appl. No.: 198,839

[22] Filed: Feb. 18, 1994

[51] Int. Cl.$^6$ .............................. B26D 7/02; B26D 7/20; B65H 20/10; D06H 7/00
[52] U.S. Cl. ............................. 83/152; 83/155; 83/422; 83/451; 83/941; 198/689.1
[58] Field of Search .......................... 83/100, 152, 155, 83/422, 451, 941; 198/689.1, 811

[56] References Cited

U.S. PATENT DOCUMENTS

| | | | |
|---|---|---|---|
| 4,485,712 | 12/1984 | Gerber | 83/451 |
| 4,528,878 | 7/1985 | Gerber | 83/56 |
| 5,001,954 | 3/1991 | Galan | 83/451 |
| 5,189,936 | 3/1993 | Gerber et al. | 83/409 |
| 5,282,407 | 2/1994 | Arikita | 83/152 X |
| 5,358,226 | 10/1994 | Arikita | 83/451 X |

FOREIGN PATENT DOCUMENTS

| | | |
|---|---|---|
| 0517143 | 12/1992 | European Pat. Off. . |
| 2682061 | 4/1993 | France . |
| 4118194 | 2/1993 | Germany . |
| 4233937 | 4/1993 | Germany . |
| 5-302260 | 11/1993 | Japan . |
| 2112314 | 7/1983 | United Kingdom . |
| 2191137 | 12/1987 | United Kingdom . |

*Primary Examiner*—Rinaldi I. Rada
*Assistant Examiner*—Raymond D. Woods
*Attorney, Agent, or Firm*—McCormick, Paulding & Huber

[57] ABSTRACT

An apparatus for conveying and cutting sheet material has an endless conveyor belt trained over rotatable end units. The endless belt defines an upper run for supporting the sheet material, a lower run spaced below the upper run, and two arcuate end sections, each extending between the upper and lower runs. A first gap is formed in the conveyor belt between one end of the upper run and the adjacent end section, and a second gap is formed in the belt between the other end of the upper run and the adjacent end section. A cutting unit is supported over the upper run for cutting the sheet material, and a vacuum is introduced in the upper run for creating a vacuum bed to hold the sheet material against the supporting surface during a cutting operation. Two end sealing assemblies are mounted between the upper and lower run, and each is located adjacent to a respective gap in the conveyor. Each end sealing assembly includes one or more sealing strips extending substantially across the width of the conveyor belt, and movable between sealing and retracted positions. In the sealing position, each sealing strip is received within the adjacent gap in the conveyor, and engages an end surface of the upper run to seal the engaged surface, thereby preventing the leakage of air through the respective end of the vacuum bed. In the retracted position, each sealing strip is retracted from the respective gap to a position below the upper run away from the path of conveyor movement.

27 Claims, 14 Drawing Sheets

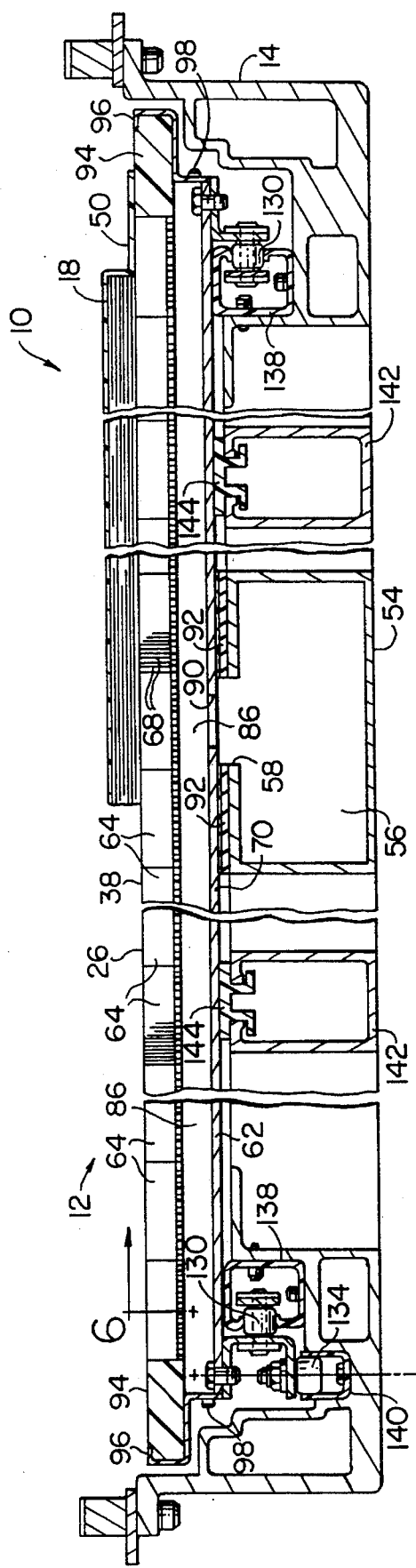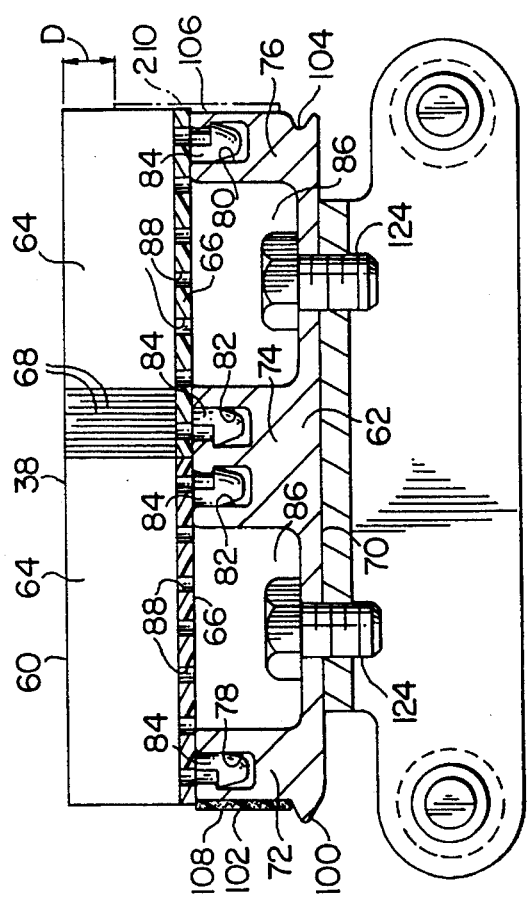

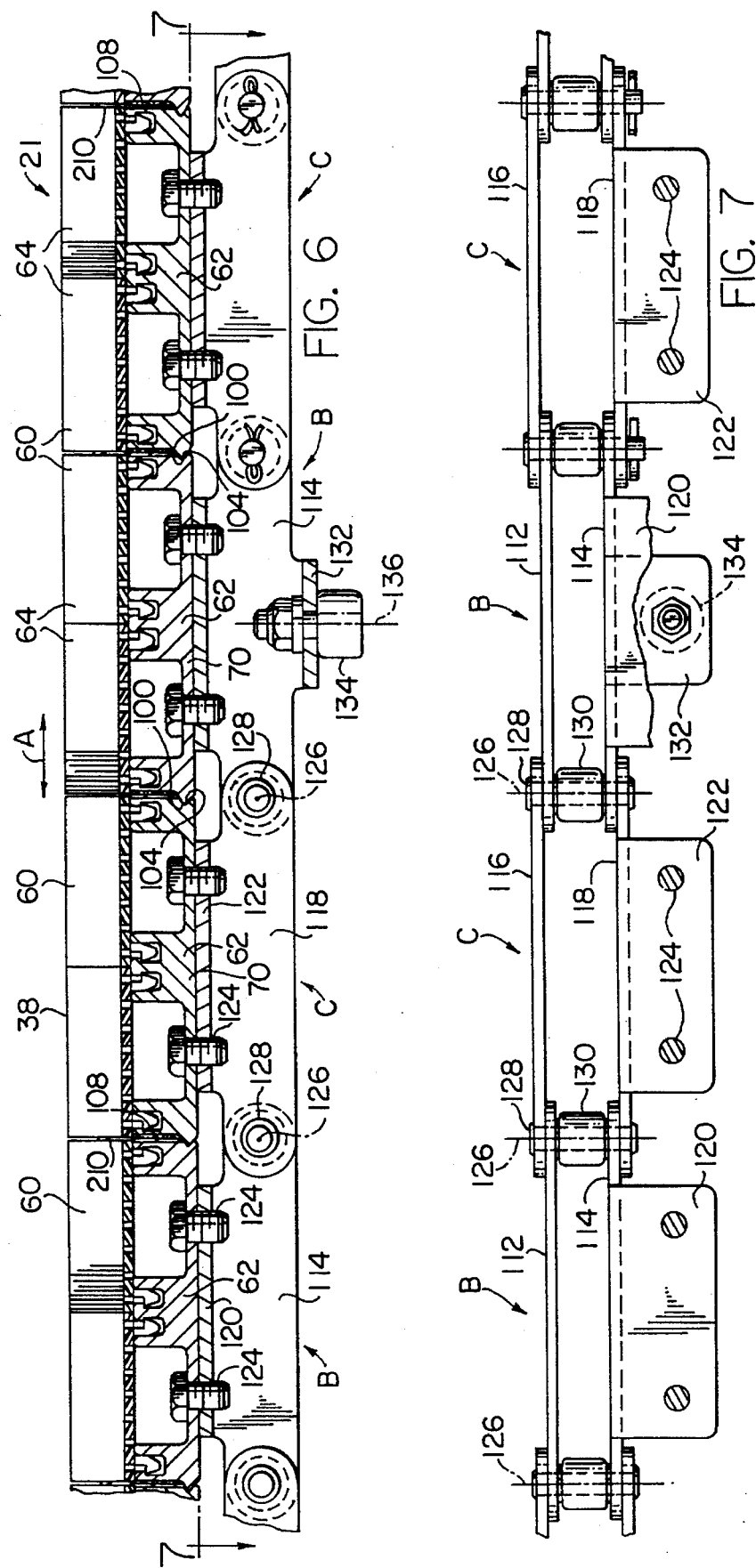

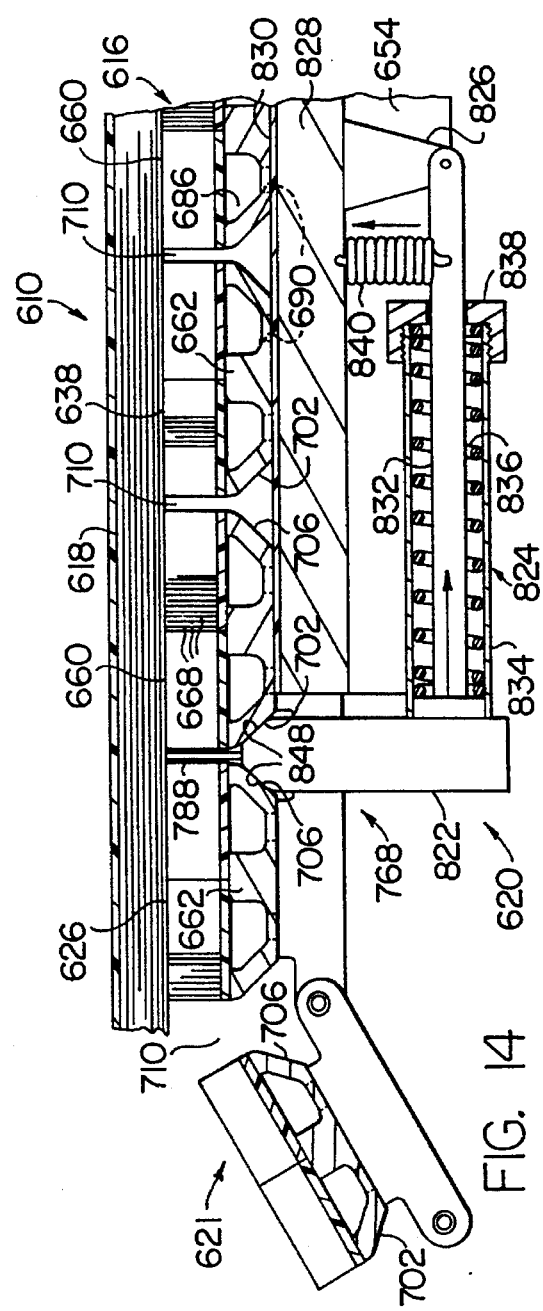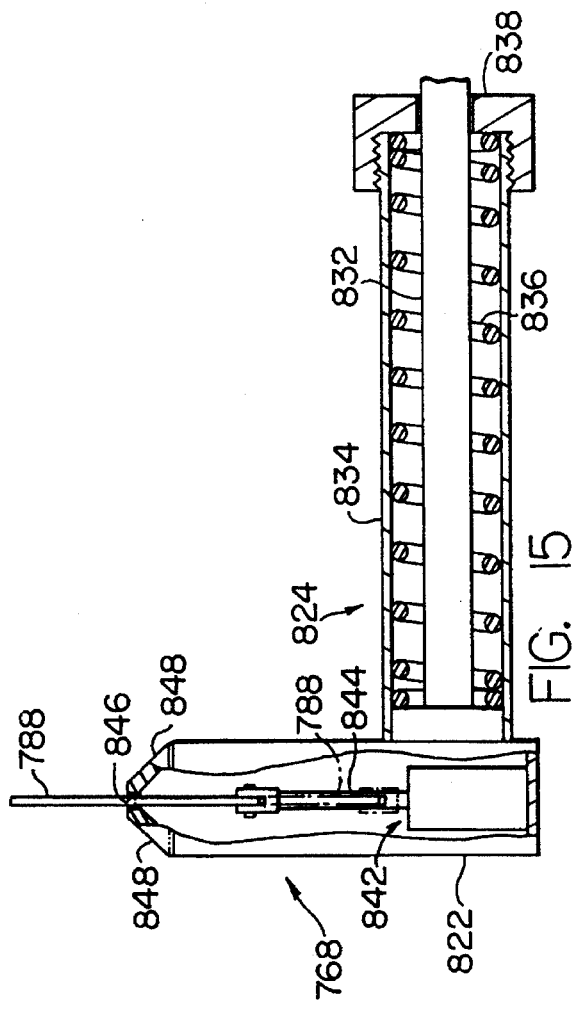

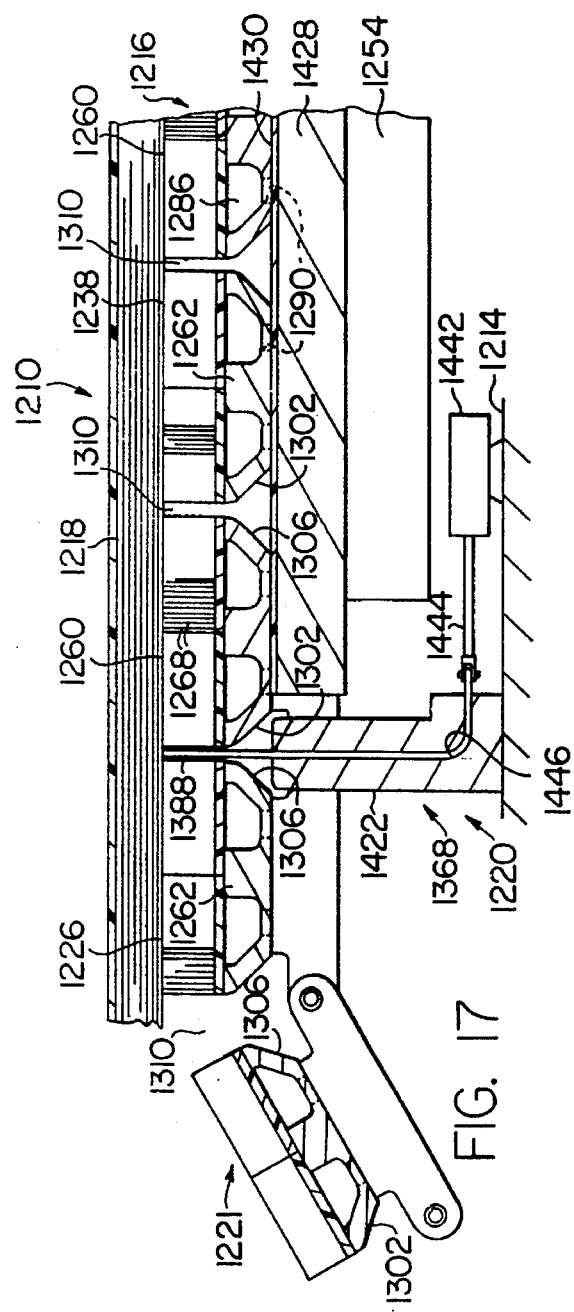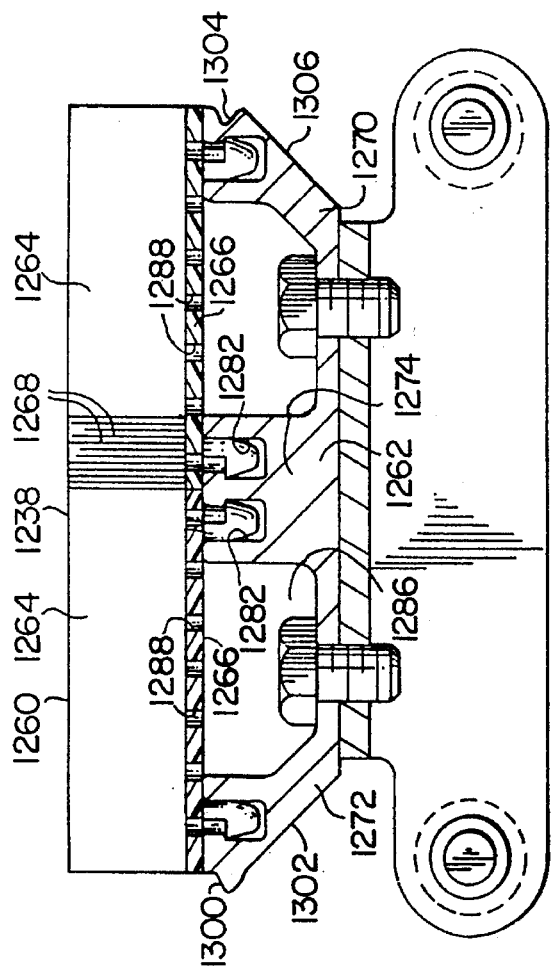

APPARATUS FOR CONVEYING AND CUTTING SHEET MATERIAL ON A VACUUM BED WITH SYSTEM FOR SEALING END PORTIONS OF THE BED

FIELD OF THE INVENTION

The present invention relates to apparatus for conveying and cutting sheet material, and more particularly, to such apparatus wherein an endless conveyor is used to support and advance the sheet material to and from a cutting station, and a vacuum is introduced through the conveyor to hold the sheet material against the conveyor.

CROSS-REFERENCE TO RELATED APPLICATIONS

The subject matter of this specification is related to the subject matter of U.S. patent application Ser. No. 08/124,803, filed Sep. 21, 1993, entitled "Jointed Barrier Strip", now U.S. Pat. No. 5,379,882, and U.S. patent application Ser. No. 07/872,508, filed Apr. 23, 1993, entitled "Cutter Re-Sealer Using Tensioned Overlay And Related Method", now U.S. Pat. No. 5,289,748, both of which are assigned to the same assignee as is the present invention.

BACKGROUND OF THE INVENTION

A typical machine for conveying and cutting sheet material includes an endless conveyor belt forming a substantially flat, horizontal supporting surface for supporting a lay-up of sheet material to be cut. The supporting surface is porous and penetrable by a cutting knife to permit the knife to extend entirely through the lay-up in the vertical direction and cut pattern pieces, for example, from the lay-up. A vacuum is introduced into the supporting surface to create a vacuum bed, which firmly holds the lay-up against the supporting surface during a cutting operation.

The endless conveyor belt typically defines a horizontal and substantially flat upper run for supporting the lay-up of sheet material, a lower run located below the upper run, and two arcuate end sections, each extending between respective ends of the upper and lower runs. The conveyor belt often comprises a plurality of slat-like supports, which are pivotally coupled together on their ends forming an endless belt. In this type of machine, the adjacent supports forming the transition between the ends of the upper run and the arcuate end sections are pivoted relative to each other, thus forming a gap between each end of the upper run and the respective arcuate end section of the belt. Each gap exposes an elongated side face of the support located at the respective end of the upper run, which permits air to leak into the vacuum created between the lay-up of sheet material and the supporting surface of the conveyor. This leakage can be substantial, typically requiring the vacuum pumps to be oversized in order to compensate for the leakage and provide a sufficient vacuum to hold the lay-up firmly against the supporting surface of the conveyor.

In one prior art machine, flexible barrier strips made of latex, for example, are each attached to one elongated side face of each slat-like support, so that when the supports are located in the upper run of the conveyor, the barrier strips are sandwiched between supports to prevent the cross-flow of air from one support to the next. In order to adequately seal one support from the next, the barrier strips extend from the base of each support to the plane of the supporting surface. This places the barrier strips in the path of the cutting knife, however, which cuts the barrier strips, and ultimately destroys their ability to adequately seal one support from the next. Unless the barrier strips are frequently replaced, which is a time-consuming and relatively expensive procedure, the leakage through the strips, and thus through the end portions of the vacuum bed can be substantial.

It is an object of the present invention to overcome the drawbacks and disadvantages of such prior art machines.

SUMMARY OF THE INVENTION

The present invention is directed to an apparatus for conveying and cutting sheet material, comprising an endless conveyor belt carried on a frame and forming a substantially flat upper run for supporting and advancing the sheet material, a lower run spaced below the upper run, and two arcuate end sections, each extending between respective ends of the upper and lower runs. The conveyor belt includes a plurality of elongated supports arranged in succession relative to each other, and pivotally coupled together forming the belt. Each support includes a permeable layer on one side, and defines elongated faces extending substantially in its elongated direction on opposite sides of the support relative to each other. Adjacent supports are rotatable relative to each other to permit movement of the belt along a closed path transverse to the elongated direction of the supports, and the permeable layers of a plurality of supports in the upper run form a substantially flat, horizontal support surface for supporting the sheet material. The conveyor belt defines one gap between the exposed, elongated faces of adjacent supports at approximately one end of the upper run, and another gap between the exposed, elongated faces of adjacent supports at approximately the other end of the upper run.

A cutting unit is carried by the frame above the upper run, and is movable in X and Y coordinate directions to cut the sheet material on the support surface. A vacuum unit is coupled in fluid communication with a plurality of the supports in the upper run, for creating a vacuum bed within the permeable support surface to hold the sheet material during a cutting operation.

Two end sealing assemblies are carried by the frame, and each is located beneath the upper run adjacent to a respective gap. Each end sealing assembly includes at least one first sealing member extending in the elongated direction of the supports, and at least one actuating unit coupled to first sealing member. Each first sealing member is movable by the corresponding actuating unit upwardly into a sealing position in engagement with an exposed elongated face and permeable layer of the adjacent support to seal the exposed surfaces, and downwardly into a retracted position away from the gap and path of conveyor movement.

In one embodiment of the present invention, each sealing assembly is biased upwardly toward the sealing position, and each sealing member is also biased toward the exposed elongated face of the adjacent support. In another embodiment of the invention, each actuating unit includes a mounting arm carrying the first sealing member, and a drive member coupled to the mounting arm for moving the arms and sealing members between the sealing and retracted positions.

Each support of the conveyor also defines a bottom face extending between the elongated faces on a side of the support opposite the permeable layer, and each bottom face defines at least one aperture in communication with the permeable layer for the passage of air from the permeable layer to the vacuum source. In one embodiment of the invention, each end sealing assembly further comprises a second sealing member, and another actuating unit coupled to the second sealing member. The second sealing member is movable by the actuating unit upwardly into a sealing position in engagement with an exposed bottom face of a support located at approximately the adjacent end of the upper run to seal the aperture of the respective support. The second sealing member is also movable by the actuating unit downwardly into a retracted position away from the bottom face of the respective support out of the path of conveyor movement.

One advantage of the present invention, is that the sealing members seal the engaged portions of the supports, and thus substantially seal the end portions of the upper run forming the vacuum bed, preventing the leakage through the end portions of the bed normally associated with prior art conveying and cutting machines. When a cutting operation is complete, the sealing members are moved from their sealing to their retracted positions to avoid interfering with operation of the conveyor belt.

Other advantages of the present invention will become apparent in view of the following detailed description of preferred embodiments and the accompanying drawings.

BRIEF DESCRIPTION OF THE DRAWINGS

FIG. 4 is a fragmentary sectional view taken along the line 4—4 of FIG. 2.

FIG. 5 is an enlarged view, partly in cross-section, showing one of the supports forming the conveyor belt of the apparatus.

FIG. 6 is an enlarged fragmentary sectional view taken along the line 6—6 of FIG. 4 showing the structure interlinking the supports of the conveyor belt.

FIG. 7 is a fragmentary sectional view taken along the line 7—7 of FIG. 6 further illustrating the structure for interlinking the supports of the conveyor belt along one side of the belt.

FIG. 14 is a partial, sectional view of another embodiment of the present invention having means for biasing the sealing strip assemblies upwardly toward the gaps in the conveyor and inwardly within the gaps, means for aligning the sealing strips with the corresponding gaps, and means for actuating the sealing strips between sealing positions within the gaps for sealing the end portions of the vacuum bed, and retracted positions out of the path of conveyor movement.

FIG. 15 is an enlarged fragmentary view of a typical sealing strip assembly and mounting arm assembly of the apparatus of FIG. 14.

FIG. 17 is a partial, schematic view of another embodiment of the present invention like the embodiments of FIGS. 14–16, having means for actuating the flexible sealing strips between sealing positions within gaps in the conveyor and retracted positions out of the path of conveyor movement.

FIG. 18 is an enlarged view, partly in cross-section, showing one of the supports forming the conveyor belt of the apparatus of FIG. 17, including a tongue and groove structure for preventing relative vertical displacement of adjacent supports.

DETAILED DESCRIPTION OF THE PREFERRED EMBODIMENTS

Figure 1:
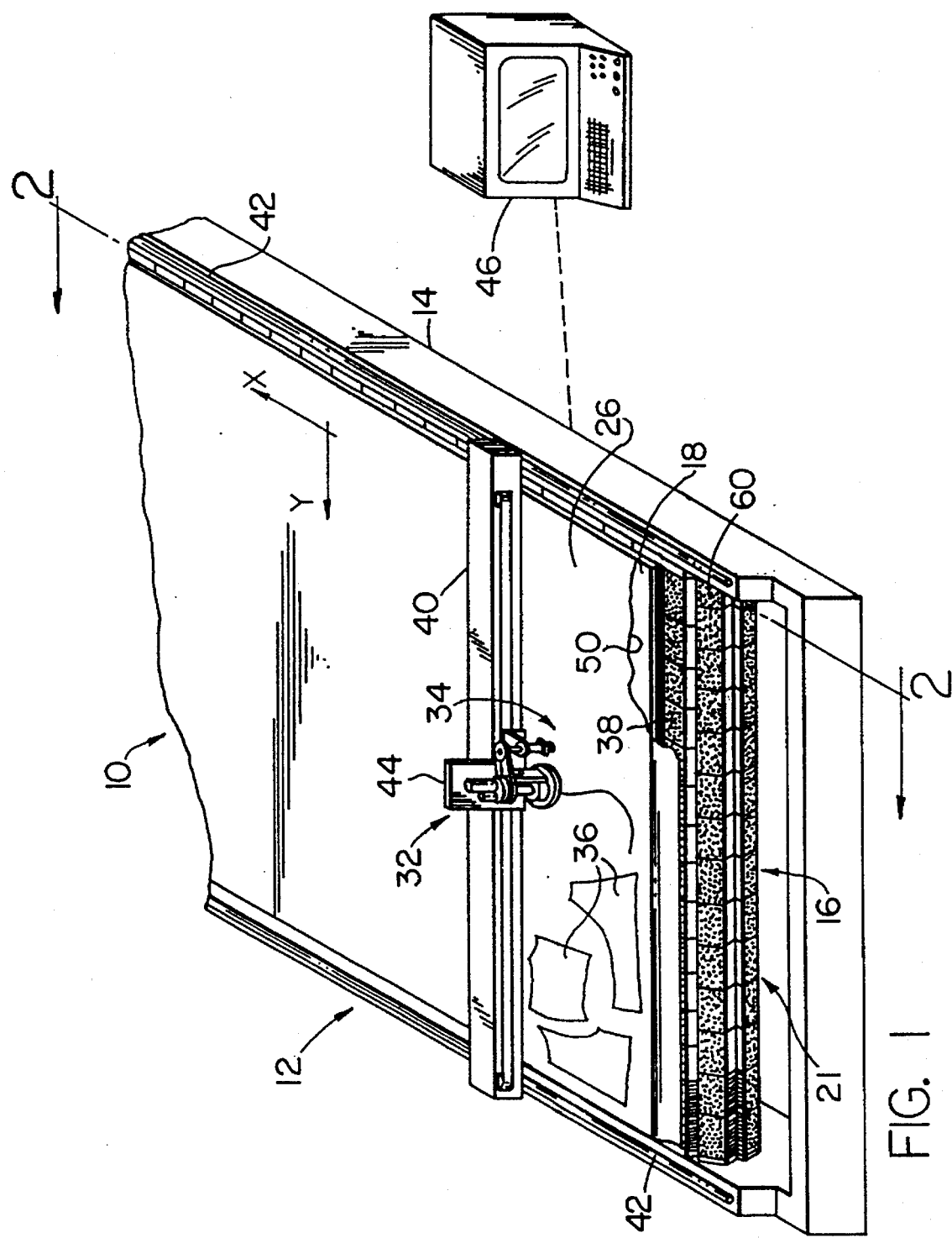
FIG. 1 is a fragmentary perspective view of an apparatus embodying the present invention for conveying and cutting sheet material on a vacuum bed, and including a system for sealing end portions of the vacuum bed.

In FIG. 1, an apparatus embodying the present invention is indicated generally by the reference numeral 10. The apparatus 10 is provided for supporting and advancing sheet material, and in the embodiment of the present invention illustrated, is part of an automatically controlled machine for cutting cloth or similar sheet material for the purpose, for example, of creating pattern pieces to be sewn or otherwise joined together to form garments. The apparatus 10 includes a table 12, having a stationary frame 14 supporting a conveyor 16 for supporting and advancing sheet material. The sheet material supported by the conveyor 16 is shown as a lay-up 18 consisting of a number of layers of sheet material spread on top of one another, but if desired the apparatus 10 may also be used with only a single layer of sheet material.

Figure 2:
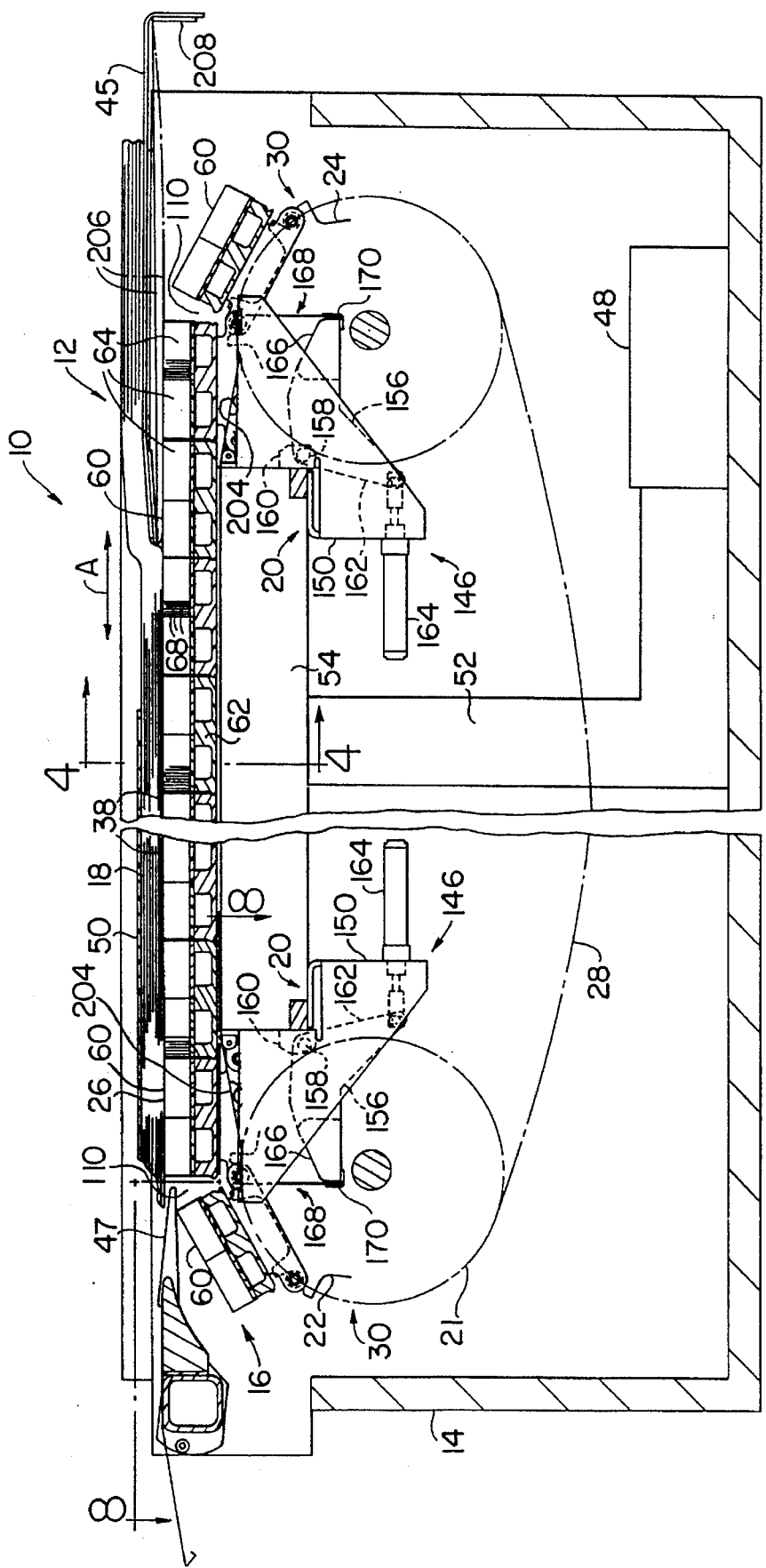
FIG. 2 is a sectional view taken generally along the line 2—2 of FIG. 1 with the cutter head and other parts removed for clarity, and with some other parts being shown schematically.

As is described in detail below, a vacuum is introduced through a material supporting surface of the conveyor 16 for creating a vacuum bed to firmly hold the lay-up of material 18 during a cutting operation. As shown in FIG. 2, the apparatus of the present invention comprises a system for sealing end portions of the vacuum bed, which includes two end sealing assemblies 20 located on opposite ends of the table relative to each other to substantially prevent or reduce the leakage of air through the end portions, and thereby reduce or minimize leakage into the vacuum between the lay-up of material and the conveyor. As is described in detail below, each end sealing assembly 20 includes movable barrier strips, and each barrier strip is driven into a gap formed within the conveyor to seal a respective end portion of the conveyor. When a cutting operation is completed, the barrier strips are retracted from the gaps away from the path of conveyor movement.

As shown schematically in FIG. 2, the conveyor 16 includes an endless conveyor belt 21, which is trained over two rotatable end units 22 and 24. The rotatable end units 22 and 24 are spaced on substantially opposite ends of the table 12 relative to each other and guide the conveyor 16 along a closed path, as indicated by the arrows A in FIG. 2. The conveyor 16 thus defines a substantially flat, horizontal upper run 26 for supporting and advancing the sheet material 18, a lower run 28, and two arcuate end sections 30, each extending between the upper and lower runs around one side of a respective rotatable end unit 22 or 24. The end units 22 and 24 are rotatable about parallel, horizontal axes fixed relative to the frame 14 and include sprockets for engaging and guiding the conveyor belt 21. At least one of the end units is driven by an electric drive motor or the like (not shown) to effect movement of the conveyor.

As shown in FIG. 1, a cutter head 32 is provided for cutting the sheet material 18, and is supported for movement in x and Y coordinate directions in a plane parallel to the top surface of the sheet material, thereby permitting two-dimensional shapes, such as the pattern pieces 36 illustrated in FIG. 1, to be cut from the material within a cutting station 34. In the embodiment of the present invention illustrated, the cutter head 32 includes a reciprocating cutting knife which during a cutting procedure extends vertically through the sheet material 18, and throughout at least a portion of its stroke extends below the lower face of the sheet material and into a supporting surface 38 of the conveyor belt 21. To permit extension of the cutting knife below the lower face of the sheet material 18, the conveyor belt 21 is constructed so that the supporting surface 38 is easily penetrable by the knife, as is described further below.

The cutter head 32 is supported for movement in the X coordinate direction by an X carriage 40, which extends across the table 12 and is supported on opposite ends by guides 42. The guides 42 are fixed to the frame 14 on opposite sides of the table relative to each other, and extend in the longitudinal direction of the table to permit movement of the X carriage 40 in the X coordinate direction, as indicated in FIG. 1. The X carriage 40 supports a Y carriage 44 for movement in the Y coordinate direction relative to the X carriage 40, with the Y carriage 44 supporting the cutter head 32. Operation of the components of the apparatus 10, including the cutter head 32 and conveyor 16 is controlled by a computer control unit 46 shown in FIG. 1 and forming a part of the overall system. With reference to FIG. 2, a take-on ramp 45 extends over one end of the table 12 for feeding the lay-up of sheet material 18 onto the table, and a plurality of take-off fingers 47 are mounted on the opposite end of the table, which project below the supporting surface 38 of the conveyor for receiving the sheet material as it is discharged by the conveyor.

As shown in FIG. 2, the table 12 includes a vacuum source 48 for creating a vacuum bed in the upper run 26 of the conveyor belt, to firmly hold the sheet material against the supporting surface 38 during a cutting operation. In the embodiment of the present invention illustrated, the vacuum source 48 is a centrifugal pump, although numerous other types of known. vacuum sources may equally be employed. In conjunction with the vacuum source, the sheet material 18 is preferably overlaid by a sheet 50 of thin, air-impermeable plastic shown best in FIG. 1. The sheet 50 is drawn downwardly against the sheet material by the vacuum, in order to reduce the leakage of air through the top surface of the sheet material into the vacuum.

Figure 3:
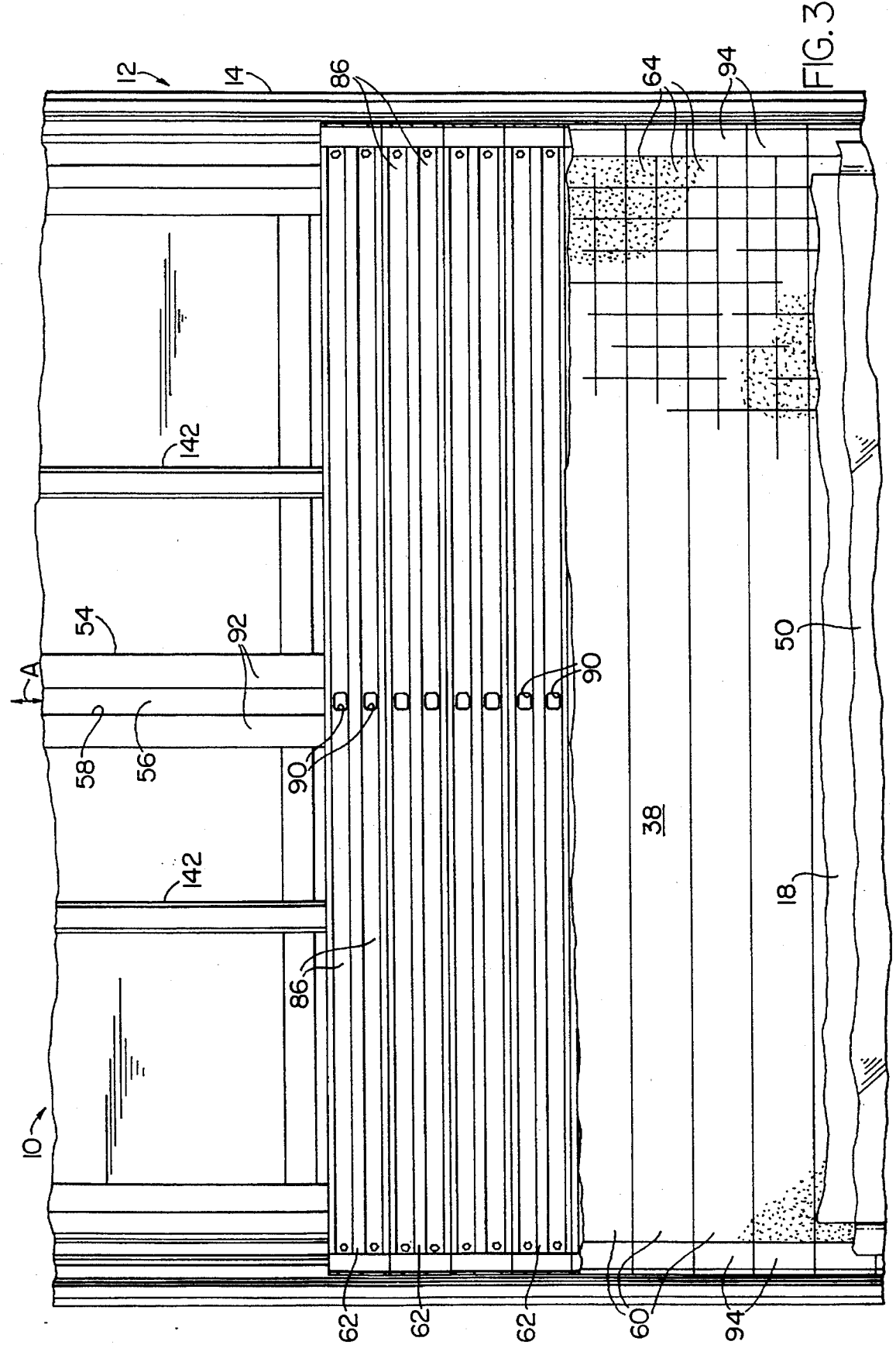
FIG. 3 is a fragmentary plan view of the apparatus of FIG. 1 with parts being shown progressively broken away to reveal the structure of underlying parts.

As shown in FIG. 2, the vacuum pump 48 is coupled through a connecting pipe 52 to a vacuum duct 54, which is located below the upper run 26 of the conveyor belt, and extends in the longitudinal direction along a major portion of the upper run. As shown in FIGS. 3 and 4, the vacuum duct 54 defines a vacuum chamber 56 and an elongated slot 58 formed through the top wall, and extending in the longitudinal direction of the duct. Operation of the vacuum pump 48 creates a vacuum within the vacuum chamber 56, which communicates with the conveyor belt 21 through the elongated slot 58 to create a vacuum bed within the supporting surface 38 of the conveyor belt, as is described further below.

As shown in FIGS. 2 and 3, the conveyor belt 21 comprises a plurality of slat-like supports 60 coupled together and forming the belt. As best shown in FIG. 3, each support 60 defines a substantially rectangular shape in plan, having a length many times greater than its width, and is oriented in a horizontal plane with its length transverse to both the longitudinal direction of the table 12 and the direction of movement of the conveyor 16, as indicated by the arrows A.

Turning to FIG. 5, a typical support 60 is illustrated in detail, and comprises a rigid metallic slat 62 which is preferably made as an extrusion of aluminum or similar extrudable metal. A plurality of bristle squares 64 are attached to the top face of each slat 62 and form the penetrable support surface 38 of the conveyor belt. The bristle squares 64 may be of the general type disclosed in U.S. Pat. No. 4,685,363, and are each made of a molded plastic material including a base portion 66, and a plurality of bristles 68 extending upward from and integral with the base portion. The upper ends of the bristles 68 of all the bristle squares 64 attached to each slat terminate in a substantially common plane, and form the supporting surface 38 when located in the upper run 26 of the conveyor.

As best seen in FIG. 3, each bristle square 64 defines a square peripheral shape in plan, and when a full complement of such squares are attached to a slat 62 they closely abut one another so that the supporting surface 38 formed by the upper ends of their bristles is substantially smooth and uninterrupted. In the embodiment of the present invention illustrated, each bristle square 64 is dimensioned so that two bristle squares located side by side extend across the width of each slat 62. If desired, however, these dimensions may be changed so that more or fewer bristles squares are attached to each slat.

As shown in FIG. 5, each slat 62 includes a bottom wall 70 and three ribs 72, 74 and 76 extending upward from the bottom wall and running the length of the slat for the attachment of the bristle squares 64 to the slat. Each of the two ribs 72 and 76 extending along the elongated side of each slat defines a narrow-mouthed groove 78 or 80 in the top surface of the rib and extending along the full length of the rib. Each middle rib 74 defines two narrow-mouthed grooves 82 spaced apart from each other in the top surface of the rib, and extending along the full length of the rib. Each bristle square 64 includes two lugs 84 extending downward from the base portion 66, and which are each shaped and arranged to be received within one of the grooves 78, 80 or 82 to releasably hold the bristle square to a respective slat. The bristle squares 64 are releasably attached to each slat by pressing the squares against the top of the slat and snapping the lugs into the corresponding grooves, or the lugs can be slidably received into the grooves at the ends of the slats.

As shown in FIGS. 3 and 5, each slat 62 defines two air passages or chambers 86, each extending along the length of the slat between the middle rib 74 and one of the side ribs 72 or 76. Air communication between the chambers 86 and the bristles 68 is provided by a large number of through openings 88 formed in and uniformly distributed over the base portion 66 of each bristle square. As shown in FIGS. 3 and 4, each slat 62 also defines two apertures 90, each extending through the base wall 70 of the slat and in communication with a respective chamber 86. As shown in FIG. 4, each aperture 90 is located in approximately the middle of the Slat in its lengthwise or elongated direction, and is aligned in communication with the elongated aperture 58 of the vacuum duct 54. Operation of the vacuum pump 48 creates a vacuum within the vacuum chamber 56, which in turn draws air through the bristles 68 and apertures 88, and into the chambers 86 of the slats. This in turn creates a vacuum bed within the bristles 68 to firmly hold the sheet material 18 against the supporting surface 38.

As shown in FIG. 4, bearing strips 92 are attached to the top wall of the vacuum duct 54 on either side of the elongated slot 58. The bearing strips 92 are made of a low-friction material and engage the bottom surfaces of the slats 62, providing both vertical support for the slats and an air seal to prevent leakage of air into the vacuum chamber 56 through the interface between the slats and the vacuum duct.

As also shown in FIG. 4, the ends of each slat 62 in its elongated direction are sealed by end blocks 94. Each end block 94 is made of a compressible air-impermeable, closed-cell material, such as a closed-cell polyethylene foam. The end blocks 94 are therefore penetrable by the cutter knife, and can receive the knife without damage to the knife if it accidentally moves beyond the ends of the bristle bed. However, because the end blocks are made of a closed-cell material, there is typically no air leakage through the blocks if they are accidentally cut. Each end block 94 is mounted between a c-shaped bracket 96 and the respective end of the slat 62, so as to seal the ends of the chambers 86 and bristle squares 64 of the slat. Each bracket 96 is fastened to the respective slat 62 by fasteners, shown typically at 98. By tightening the fasteners 98, the respective c-shaped bracket 96 compresses the end block 94 against the end surfaces of the slat and adjacent bristle squares 64, sealing both the ends of the slats and the bristle squares. The end blocks 94 are also dimensioned to be slightly wider than the slats so that they extend over the side edges of the slats, and engage one another in the upper run 26 to prevent the leakage of air between adjacent end blocks.

In this embodiment of the present invention, the supports 60 are also provided with co-engageable parts extending along their lengths which, when the supports form part of the upper run 26, engage one another to prevent relative vertical displacement of adjacent supports. The co-engageable parts thereby maintain the supporting surfaces of adjacent supports in co-planar registration with each other along their lengths to maintain a substantially flat composite supporting surface 38 extending over the entire extent of the upper run 26. These co-engageable parts may take the form of wedge-shaped tongues and grooves formed on and in the slats 62 of adjacent supports 60, as disclosed, for example, in U.S. Pat. No. 5,189,936.

With reference to FIGS. 5 and 6, each slat 62 includes a tongue 100 formed on one elongated side face 102, and a complementary groove 104 formed on the opposite elongated side face 106. As two adjacent supports 60 move over one of the rotatable end units 22 or 24 in the direction toward the upper run 26, their respective tongue and groove move into gradual engagement with one another in order to maintain the slats in proper vertical relationship with each other. In order to prevent the passage of air between the elongated side faces of adjacent slats, a compressible strip 108 is adhesively attached to the elongated side face 102 of each slat. Each strip 108 is preferably made of a compressible foam plastic material or the like, which is compressed between adjacent slats when forming part of the upper run 26 to prevent the leakage of air through this interface.

As shown in FIGS. 6 and 7, adjacent slats 62 of the supports 60 are linked together at two connecting points positioned at the two ends of the supports to link the supports into the endless conveyor belt 21. The connecting points permit the slats 62 to pivot relative to each other about pivot axes which extend transverse to the path of movement of the conveyor belt 21. For the supports 60 located in the upper run 26, the connecting points are located beneath the supporting surface 38, and are positioned so that the elongated side faces of adjacent supports are located sufficiently close to each other to compress the strips 108 and thereby seal the interfaces between adjacent supports. The connecting points are also positioned so that when adjacent supports pass over one of the rotatable end units 22 or 24, the adjacent elongated side faces 102 and 106 move apart from one another as shown in FIG. 2, defining a gap 110 between each end of the upper run 26 and the adjacent arcuate end section 30.

The means for linking the supports 60 to one another and forming the pivotal connecting points at their ends is shown typically in FIGS. 6 and 7. Because the means for linking the ends of the supports is the same on both ends, it is illustrated for only one of the ends in FIGS. 6 and 7. With reference to FIG. 7, first and second pairs of links B and C are each coupled to a respective slat 62, and are alternately coupled together in succession to form the endless conveyor belt 21. Each pair B comprises links 112 and 114, and each pair C comprises links 116 and 118. The links 114 and 118 each include an outward projecting flange 120 and 122, respectively, which are each in turn attached to the base wall 70 of the respective slat 62 by screws 124.

Each link pair B or C is connected to the next adjacent link pair, for rotation of the respective supports 60 relative to each other about a horizontal pivot axis 126 extending transverse to the travel path A, by a horizontal pivot pin 128. As shown in FIG. 7, each pivot pin 128 is received through aligned apertures formed in each of the respective four links 112, 114, 116, 118, to pivotally couple the respective pairs of links to one another. Each pivot pin 128 carries a roller 130, and every other link 114 further includes a horizontally projecting flange 132 carrying a roller 134 rotatable about a vertical axis 136.

As shown in FIG. 4, in order to guide the conveyor belt 21 through the upper run 26, the table 12 includes a pair of generally c-shaped, elongated guide rails 138, each extending along a respective side of the frame 14, and receiving the rollers 130 of the supports. Each guide rail 138 restrains the rollers 130 in the upper run from vertical movement in either direction, while permitting the rollers to move in the longitudinal direction of the table. Similarly, the table 12 includes a u-shaped guide rail 140 mounted on one side of the frame 14 adjacent to the respective guide rail 138 and extending in the longitudinal direction of the table. The guide rail 140 receives the rollers 134 of the conveyor belt to restrain the belt against lateral movement while permitting the belt to move in the longitudinal direction of the table. Two vertical supports 142 are supported by the frame 14 on opposite sides of the vacuum duct 54 relative to each other, and each extends in the longitudinal direction of the table to provide additional vertical support for the conveyor belt in the upper run. Bearing strips 144 are attached to the top surface of each support 142, and are made of a low-friction material to facilitate sliding movement of the slats over the vertical supports.

In FIGS. 8 through 11, a typical end sealing assembly 20 is illustrated in further detail. The two end sealing assemblies 20 are identical, and as shown in FIG. 2, each assembly is located beneath a respective gap 110 formed between exposed, elongated faces of adjacent supports 60 at each end of the upper run 26 to seal a respective end portion of the vacuum bed. As shown typically in FIG. 8, each end sealing assembly 20 extends across the respective end portion of the upper run 26, and includes two outer actuating units 146 and two inner actuating units 148, for actuating sealing strips of the assemblies between sealing positions within the adjacent gaps 110 to seal the respective end portions of the vacuum bed, and retracted positions below the gaps and away from the path of conveyor movement. Each outer actuating unit 146 is carried by a bracket 150 mounted on a lateral support of the frame 14 adjacent to a respective rotatable end unit 22 or 24. Each inner actuating unit 148 is carried by a bracket 152, which is mounted beneath the vacuum duct 54.

Figure 9:
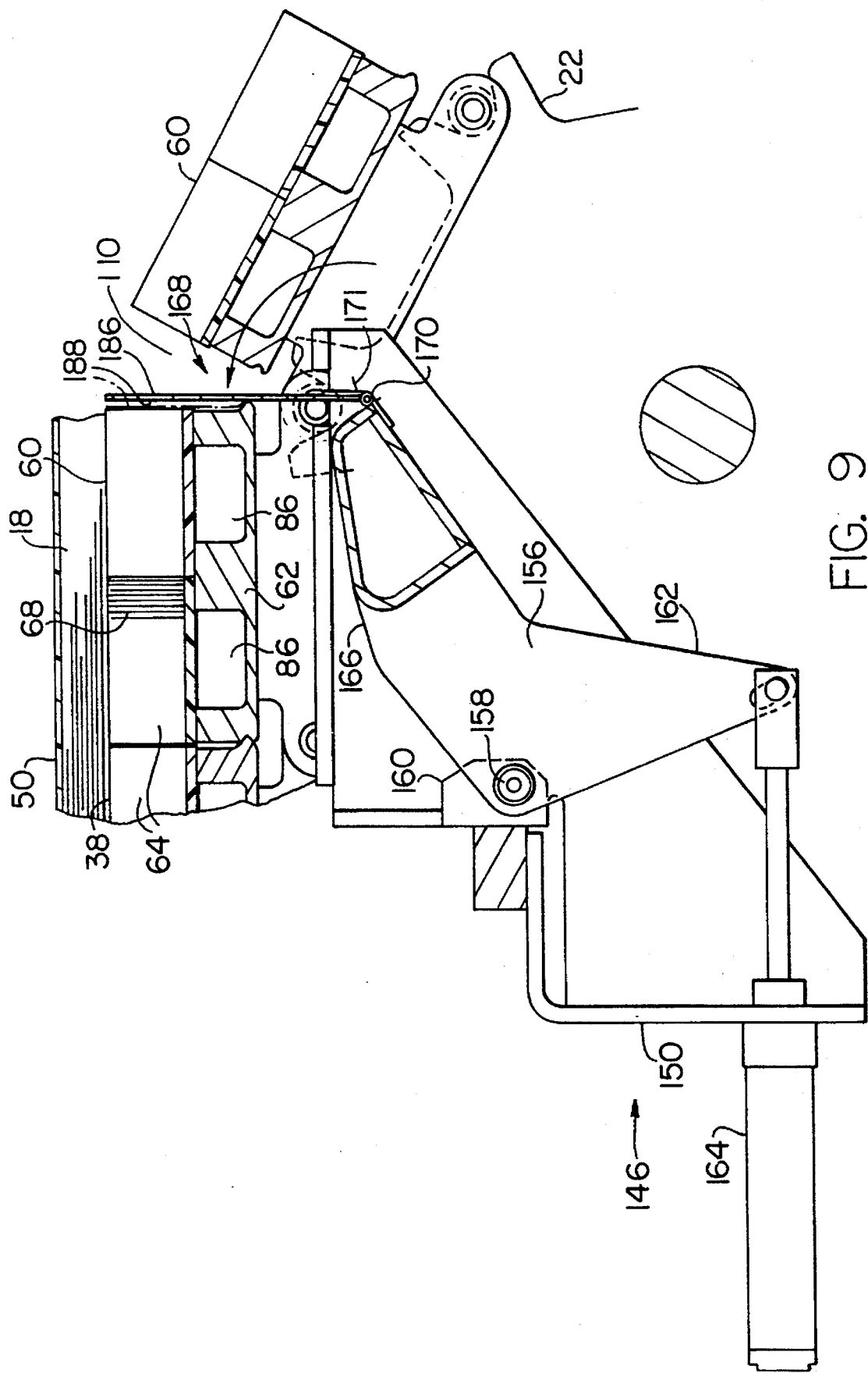
FIG. 9 is an enlarged fragmentary view, partly in section, taken along line 9—9 of FIG. 8, illustrating one of the actuating units and sealing strip assemblies of the apparatus.

As shown best in FIG. 9, the outer actuating units 146 each include an outer actuating or mounting arm 156, pivotally coupled by a pin 158 to a respective support bracket 160. Each outer arm 156 includes a first leg 162 coupled to a respective outer drive cylinder 164, and a second leg 166 carrying one end of a respective first sealing strip assembly 168. Each outer drive cylinder 164 is mounted on a respective bracket 150, and is actuated to drive the respective outer arm and first sealing strip assembly between a retracted position, as shown in FIG. 2, and a sealing position, as shown typically in FIG. 9. Each outer drive cylinder is coupled to the control unit 46 to control actuation of the cylinders. As shown best in FIG. 9, each first sealing strip assembly 168 is coupled by means of a hinge 170 to the free end of the second leg 166 of the respective arm. Each hinge 170 includes a suitable biasing mechanism, such as a torsion spring 171 or the like, which normally biases the sealing strip assembly toward the exposed elongated face of the support 60, as indicated typically by the arrow in FIG. 9.

Figure 10:
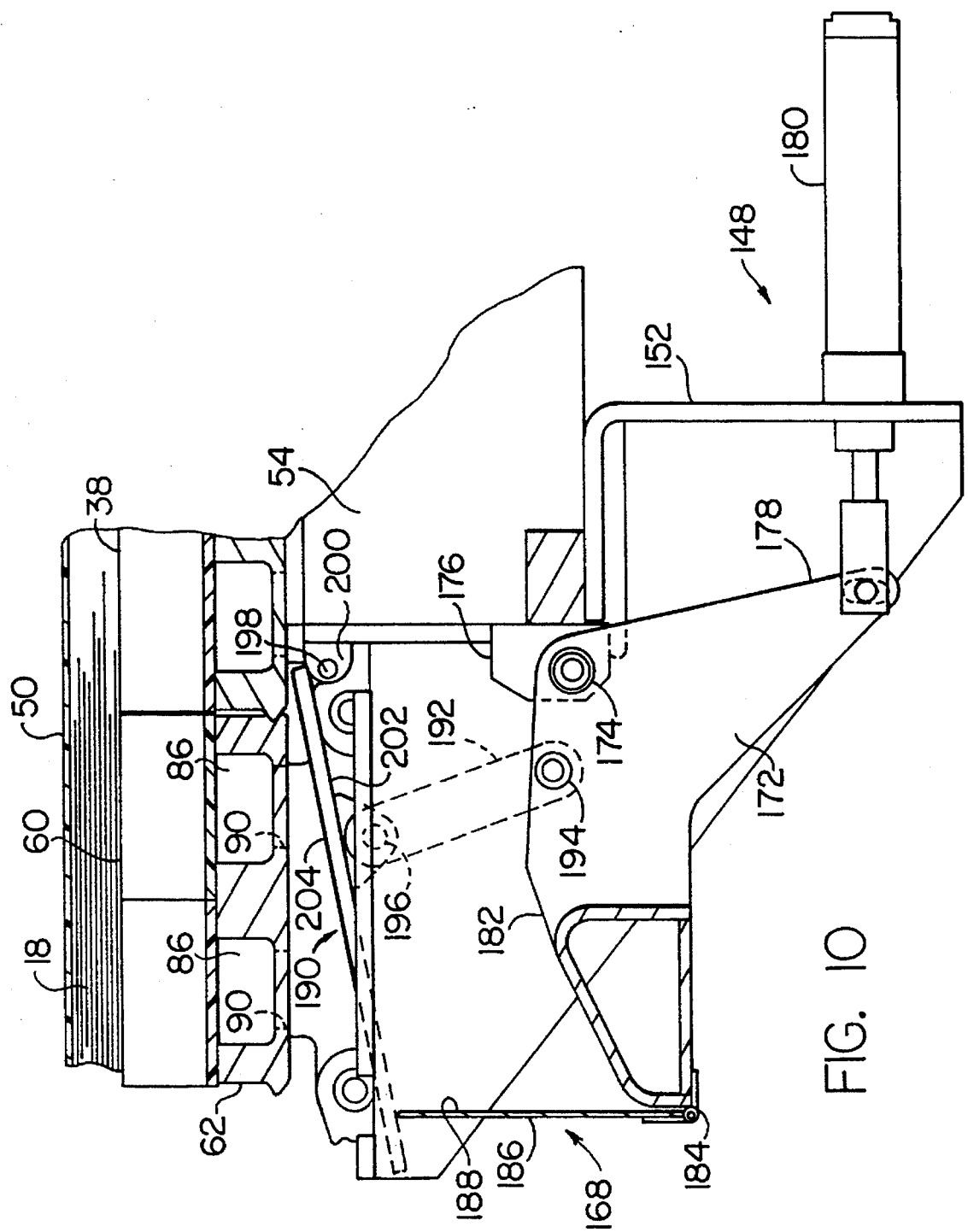
FIG. 10 is an enlarged fragmentary view, partly in section, taken along line 10—10 of FIG. 8, illustrating another actuating unit and sealing strip assembly for sealing the bottom-end portions of the vacuum bed and located in a retracted position.
Figure 11:
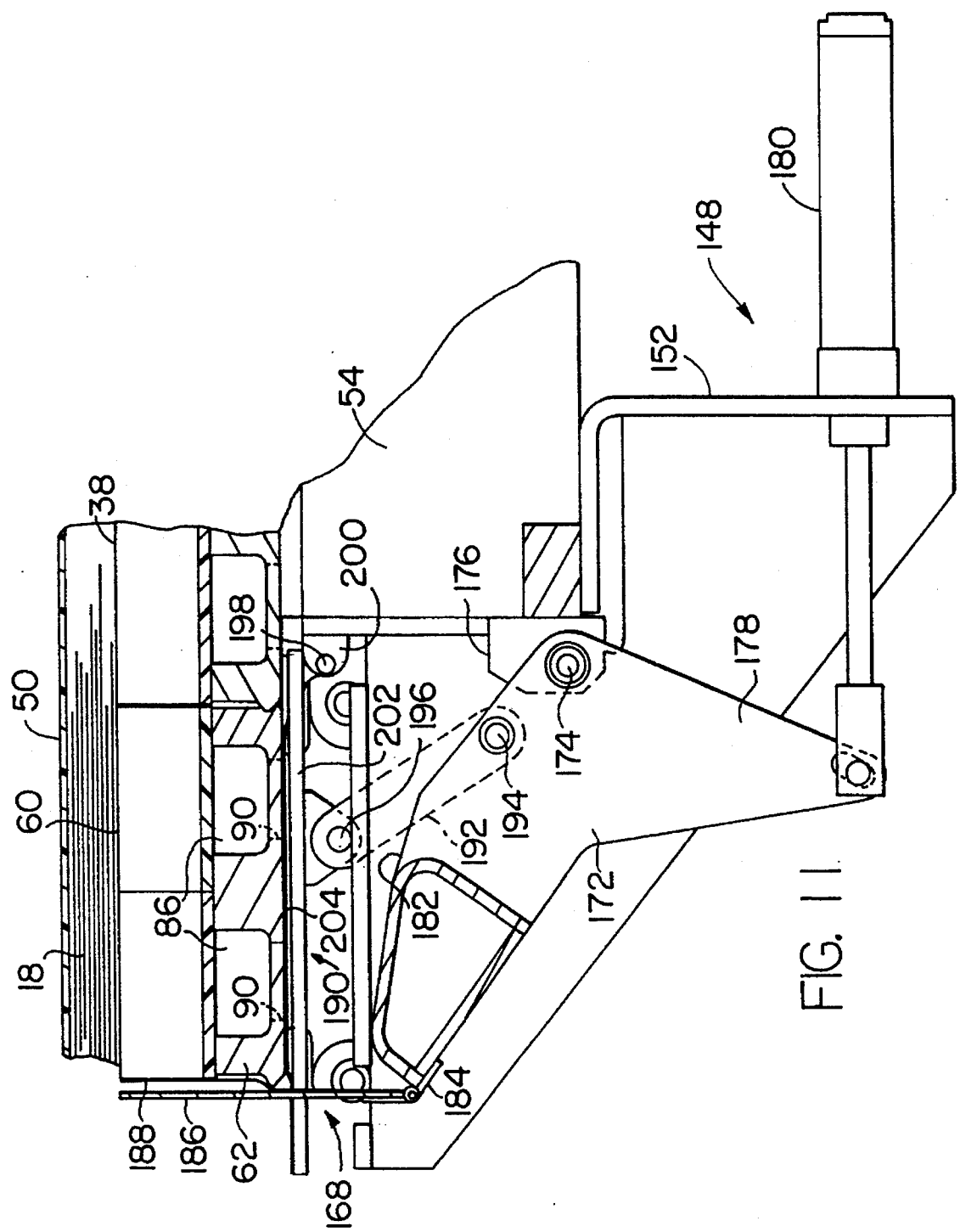
FIG. 11 is the same view as FIG. 10 illustrating the actuating unit and sealing strip assembly in its sealing position.

As shown best in FIGS. 10 and 11, each inner actuating unit 148 includes an inner actuating or mounting arm 172, pivotally coupled by a pin 174 to a respective support bracket 176. Each inner arm 172 includes a first leg 178 coupled to a respective inner drive cylinder 180, and a second leg 182 carrying the other end of a respective first sealing strip assembly 168. Each inner drive cylinder 180 is mounted on the respective bracket 152 and coupled to the control unit 46, which actuates each inner drive cylinder synchronously with the associated outer drive cylinder 164 to drive the respective inner arm and first sealing strip assembly between a retracted position, as shown typically in FIG. 10, and a sealing position, as shown typically in FIG. 11. Each first sealing strip assembly 168 is coupled by means of a hinge 184 to the free end of the second leg 182 of the respective arm. Like the outer hinges 170, each inner hinge 184 includes a suitable biasing mechanism (not shown) such as a torsion spring or the like, which normally biases the first sealing strip assembly toward the exposed elongated face of the adjacent support 60, as shown typically in FIG. 11.

As shown typically in FIG. 9, each first sealing strip assembly 168 includes a flat backing plate 186, extending in the elongated direction of the supports between respective inner and outer actuating units. Each backing plate 186 is attached on one end at its lower edge to a respective outer hinge 170, as shown in FIG. 9, and is attached in the same fashion on its opposite end to the respective inner hinge 184, as shown in FIG. 10. A flexible sealing strip 188 extends over the inside face of each backing plate 186, and is attached to the lower edge of the backing plate, permitting the unattached portion of the sealing strip to flex inwardly in response to vacuum forces into engagement with the exposed, elongated face of the adjacent support 60 to seal the engaged portion of the support, as is described further below. Each sealing strip 188 is made of a flexible, impervious material, such as mylar or other suitable plastic.

Figure 8:
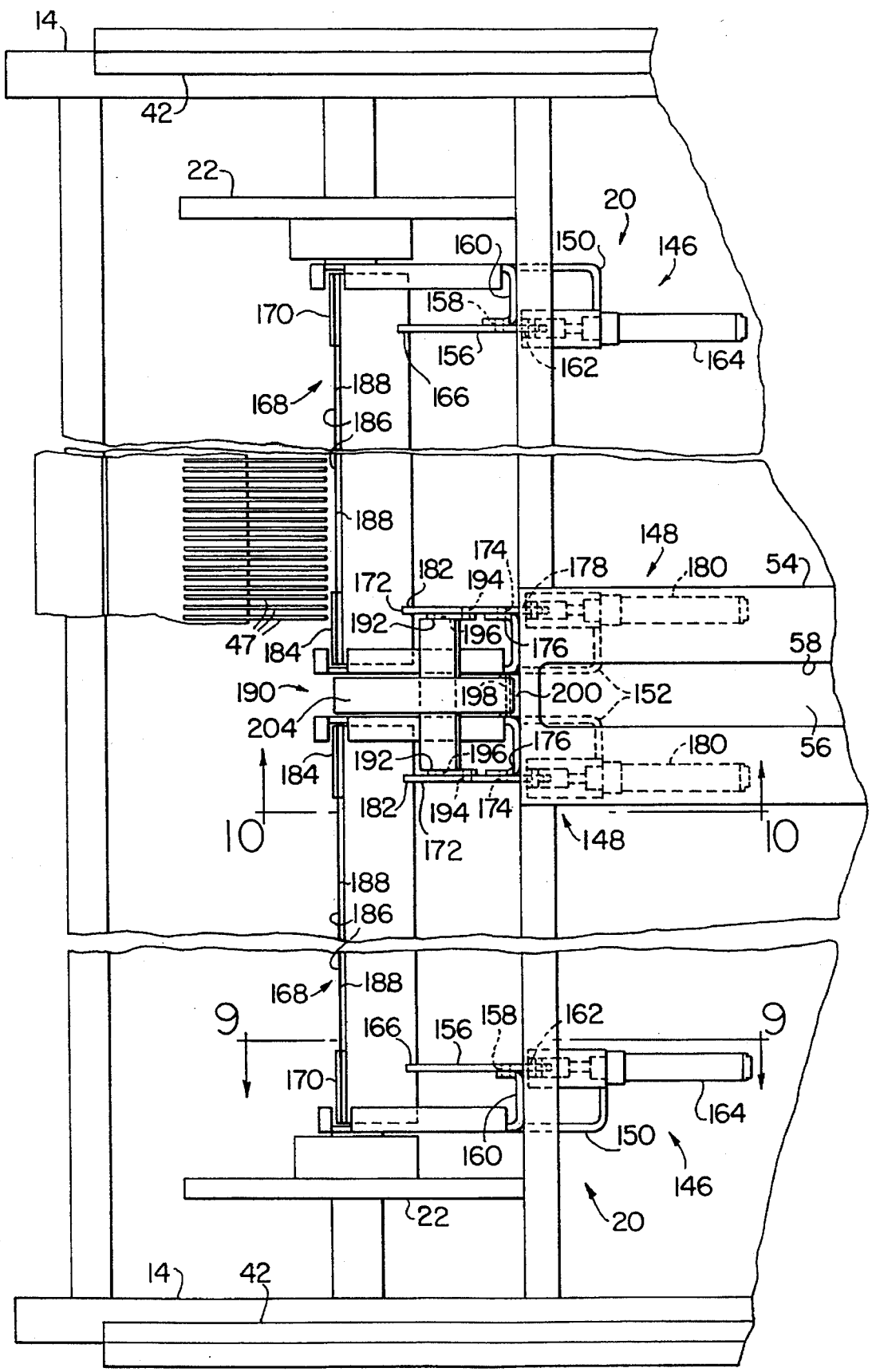
FIG. 8 is a fragmentary sectional view taken along the line 8—8 of FIG. 2, with parts being removed for clarity, and illustrating one of the end sealing assemblies of the apparatus.

As shown typically in FIG. 8, each end sealing assembly 20 also includes a second sealing strip assembly 190, located between the first sealing strip assemblies 168 at the respective end of the upper run 26, in order to seal the bottom apertures 90 of the supports 60 extending beyond the ends of the vacuum duct 54. As shown typically in FIGS. 10 and 11, the second leg 182 of each inner arm 172 is coupled by means of a link 192 to one side of the respective second sealing strip assembly 190. Each link 192 is pivotally attached on one end by a first pivot pin 194 to the second leg 182, and is pivotally attached on the other end by a second pivot pin 196 to the underside of the second sealing strip assembly. The inside edge of each second sealing strip assembly is pivotally coupled by a pivot pin 198 to a respective bracket 200 mounted on the adjacent end of the vacuum duct 54. Actuation of each inner mounting arm 172 upwardly into the sealing position, as shown typically in FIG. 11, drives the respective second sealing strip assembly into engagement with the bottom surface of the support(s) 60 overhanging the vacuum duct 54 at the respective end of the upper run 26 to seal the exposed apertures 90.

As shown typically in FIG. 10, each second sealing strip assembly 190 includes a flat backing plate 202, coupled on its inside edge to the respective pivot pin 198, and a flexible sealing strip 204 superimposed over the backing plate, and attached to the plate along its inside edge in a suitable manner, such as by adhesive. Each sealing strip 204 is made of a flexible, impervious material, such as mylar or another suitable plastic. When the second sealing strip assemblies 190 are moved into their sealing positions, as shown typically in FIG. 11, the vacuum introduced through the exposed apertures 90 draws the unattached portions of the sealing strips 204 upwardly into engagement with the exposed bottom surfaces of the slats 62 to seal the apertures.

As shown in FIG. 2, a sealing sheet 206 is also provided below the take-on ramp 45 to seal the supporting surface 38 of the conveyor belt located below the ramp. The sealing sheet 206 extends across substantially the entire width of the supporting surface 38 to seal the entire supporting surface beneath the take-on ramp. The sealing sheet 206 is attached on one side to the front edge of the take-on ramp 45, and is attached on the opposite side to a clamp 208 coupled to the underside of the ramp. The sealing sheet 206 is made of a flexible, impervious material, such as latex or other suitable plastic, and is loosely suspended between the front edge of the take-on ramp 45 and the clamp 208. When a vacuum is introduced through the bristles 68 in the upper run, the suction forces pull the sealing sheet 206 against the supporting surface 38 beneath the take-on ramp, as illustrated in broken lines in FIG. 2, to seal the supporting surface.

In the operation of the apparatus of the present invention, the control unit 46 controls movement of the conveyor 16 to properly position the lay-up 18 relative to the cutter head 32 for performing a cutting operation. Once the lay-up is properly positioned, the vacuum pump 48 is actuated to create a vacuum within the vacuum chamber 56 of the vacuum duct, and in turn within the chambers 86 and bristles 68 of the supports 60 located in the upper run 26. The control unit 46 also simultaneously actuates the inner and outer drive cylinders 164 and 180, respectively, to drive the first sealing strip assemblies 168 and second sealing strip assemblies 190 from their retracted into their sealing positions. As illustrated typically in FIG. 9, the first sealing strip assemblies 168 are therefore driven upwardly into the adjacent gaps 110, and as shown typically in FIG. 11, the second sealing strip assemblies 190 are driven upwardly into engagement with the exposed bottom surfaces of the supports 60 overhanging the vacuum duct 54.

The spring-biased hinges 170 and 184 of the inner and outer drive units, normally bias the first sealing strip assemblies against the exposed elongated faces of the adjacent supports 60, substantially sealing the end faces of the vacuum bed in the upper run. The vacuum within the adjacent bristles 68 pulls the unattached portions of the sealing strips 188 into engagement with the exposed elongated faces of the support, as illustrated typically in broken lines in FIG. 9, to seal the end portions of the upper run engaged by the strip. As shown typically in FIG. 9, each flexible sealing strip 188 extends upwardly in the sealing position so that the uppermost edge of the strip terminates at approximately the level of the supporting surface 38 in order to substantially cover the exposed end face of the vacuum bed beneath the lay-up 18. If the lay-up is not continuous, however, and does not extend over a gap 110, then the respective sealing strip may extend upwardly beyond the supporting surface to also engage the exposed end face of the lay-up.

As shown typically in FIG. 11, the vacuum within the chambers 86 of the end slats 62 overhanging the ends of the vacuum duct 54 pulls the second sealing strips 204 into engagement with the exposed bottom surfaces of the slats to seal the exposed apertures 90, and thereby further prevent leakage through the end slats. The vacuum also pulls the sealing sheet 206 downwardly, as illustrated in broken lines in FIG. 2, to seal the supporting surface 38 located beneath the take-on ramp 45.

When a cutting operation is complete, the vacuum pump 48 is typically deactivated to permit the lay-up 18 to be easily removed from the conveyor. The inner and outer drive cylinders 164 and 180 are also actuated by the control unit 48 to drive the first sealing strip assemblies 168 and second sealing strip assemblies 190 into their retracted positions out of the path of conveyer movement. As shown in FIG. 2, in their retracted positions, the first sealing strip assemblies 168 are retracted from the gaps 110 to permit movement of the conveyor belt 21, and as shown typically in FIG. 10, the second sealing strip assemblies 190 are pivoted downwardly away from the adjacent supports 60 to likewise avoid interfering with movement of the conveyor belt.

Although flexible barrier strips are not required between adjacent supports in the apparatus of the present invention, they may be added if desired to reduce the cross-flow of air between supports. A typical such barrier strip 210 is illustrated in broken lines in FIG. 5, and is dimensioned so that the free edge of the strip terminates a vertical distance D below the supporting surface 38 of the conveyor to avoid contact with the cutter knife during a cutting operation. This prevents the barrier strips 210 from being damaged by the cutter, as with prior art systems, and thus avoids the time and expense associated with such prior art systems in having to replace such strips.

Figure 12:
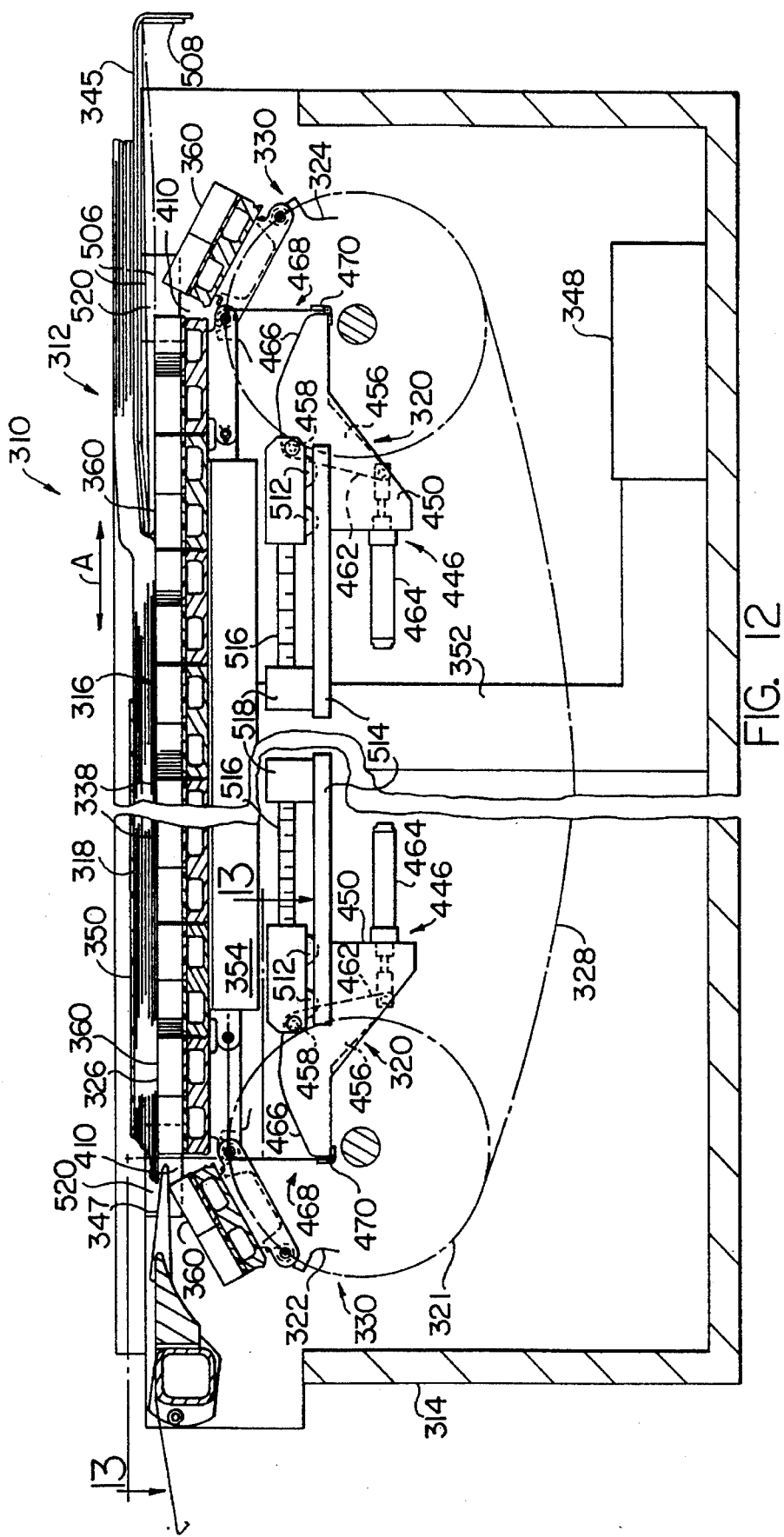
FIG. 12 is a sectional view of another embodiment of the present invention having means for moving and aligning the end sealing assemblies with the corresponding gaps formed in the conveyor, with the cutter head and other parts removed for clarity, and with some other parts being shown schematically.
Figure 13:
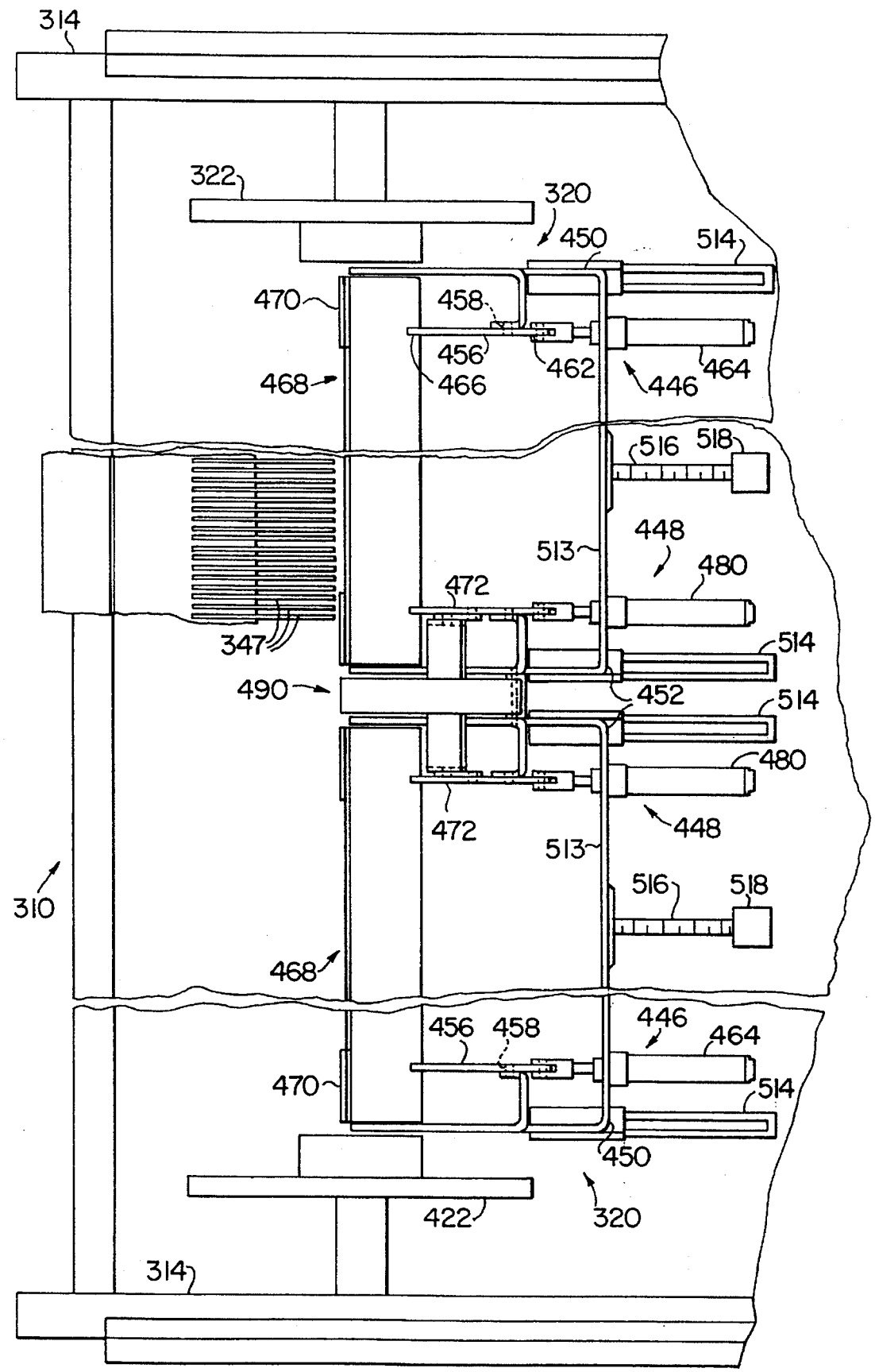
FIG. 13 is a fragmentary view taken along the line 13—13 of FIG. 12 with parts removed for clarity, illustrating the means for moving and aligning a typical end sealing assembly with a corresponding gap in the conveyor.

Turning to FIGS. 12 and 13, another embodiment of an apparatus of the present invention is indicated generally by the reference numeral 310. The elements of the apparatus 310 are designated with reference numerals between 300 and 500, and because this embodiment of the invention is the same in many respects as the apparatus 10 described above, like reference numerals preceded by the numerals 3, 4 and 5, instead of 0, 1 and 2, respectively, are used to indicate like elements. The apparatus 310 differs from the apparatus 10 essentially in the mounting arrangement of the end sealing assemblies 320. Each end sealing assembly 320 is movable in the longitudinal direction of the table in order to align the first sealing strip assemblies 468 with the corresponding gaps 410, if necessary, as is hereinafter described.

Each outer actuating unit 446 is carried on a frame 450 mounted by bearings 512 in the groove of a respective guide rail 514. As shown in FIG. 13, each inner actuating unit 448 is carried on a respective frame 452 which is mounted by bearings (not shown) in the groove of a respective guide rail 514. The first and second sealing strip assemblies 468 and 490 are carried by the respective actuating or mounting arms 456 and 472, which are each in turn carried by the frames 450 and 452, respectively. Each guide rail 514 is carried by the frame 314, and extends in the longitudinal direction of the table, thus permitting movement of the inner and outer actuating units 446 and 448, and first and second sealing strip assemblies 468 and 490 in the longitudinal direction of the table, in order to align the sealing strips with the corresponding gaps in the conveyor, as is described further below.

As shown in FIG. 13, the frame 450 of each outer actuating unit 446 is coupled to the frame 452 of the adjacent inner actuating unit 448 by a respective cross-bar 513. Each cross-bar 513 is coupled to one end of a respective drive screw 516, which is driven by a respective stepping motor 518. Actuation of the stepping motors 518 rotatably drives the screws 516, which in turn drives the cross-bars 513, and thus the respective first and second sealing strip assemblies 468 and 490 in the longitudinal direction of the table, in order to align the sealing strips with the corresponding gaps 410 in the conveyor. The control unit 348 (not shown) is coupled to each stepping motor 518 to control operation of the motors, and thereby control alignment of the sealing strips with the gaps in the conveyor.

As shown in FIG. 12, a pair of optical sensors 520 are each mounted on the table 312 over an area covering the transition between one end of the upper run 326 and the adjacent arcuate end section 330 within which a respective gap 410 is located. Each optical sensor 520 is of a type known to those skilled in the pertinent art, and senses the position of the respective first sealing strip assembly with respect to the gap and transmits signals indicative thereof to the control unit 348 (not shown). The control unit 348 is responsive to the signals transmitted by the optical sensors to control operation of the stepping motors 518 so as to precisely align the first sealing strip assemblies 468 with the corresponding gaps 410 in the conveyor.

One advantage of this embodiment of the present invention, is that the conveyor belt 321 can be stopped at any desired location to perform a cutting operation. If the gaps 410 are not properly aligned with the first sealing strip assemblies 468, operation of the stepping motors 518 is precisely controlled based on the signals transmitted by the optical sensors 520 to align each first sealing strip assembly 468 with its respective gap 410.

Turning to FIGS. 14 and 15, another embodiment of the present invention is indicated generally by the reference numeral 610. The elements of the apparatus 610 are designated with reference numerals between 600 and 800, and because this embodiment of the invention is the same in many respects as the apparatus 10 described above, like reference numerals preceded by the numerals 6, 7 and 8, instead of 0, 1 and 2, respectively, are used to indicate like elements.

The apparatus 610 differs from the embodiments described above in that it includes means for normally biasing the first sealing strip assemblies upwardly into the gaps at the ends of the upper run, and toward the exposed elongated faces of the conveyor. The apparatus 610 also includes means for actuating each sealing strip 788 upwardly into a sealing position to substantially seal the engaged surfaces of the conveyor and prevent the leakage of air through the end portions of the vacuum bed, and downwardly into a retracted position to avoid interference with conveyor movement.

As shown in FIG. 14, the supports 660 are spaced relative to each other, forming gaps 710 between adjacent supports for receiving the first sealing strip assemblies 768 when located at or adjacent to one end of the upper run. The gaps 710 are exaggerated in width in FIG. 14 for purposes of illustration, and in practice should have a minimum width dimension sufficient to receive a respective sealing strip 788 without interference. As also shown in FIG. 14, the elongated side faces 702 and 706 of each slat 662 are formed as beveled surfaces for guiding and aligning the sealing strip assemblies with respect to the gaps 710. In the embodiment of the invention illustrated, the side faces 702 and 706 are each beveled at an angle of approximately 45° relative to the horizontal. This angle is only exemplary, however, and may be changed as necessary to meet other requirements.

As shown typically in FIG. 14, each first sealing strip assembly 768 includes several base members 822 (only one shown) carrying the respective sealing strip 788, and spaced relative to each other along the length of the strip. Each base member 822 is carried by a respective mounting arm assembly 824 pivotally coupled to a respective pivot mount 826. Preferably, there are at least two base members 822 and respective mounting arm assemblies 824 carrying each first sealing strip 788, each being located approximately at a respective end of the strip. However, if necessary, additional base members and mounting arm assemblies may be added to support longer strips. The apparatus 610 preferably also includes two second sealing strip assemblies 790 (not shown) for sealing the exposed apertures 690 of the slats 662 at the ends of the upper run. Each second sealing strip assembly is mounted between adjacent first sealing strip assemblies 768 at a respective end of the upper run, and is carried in the same manner as the second sealing strip assemblies in the embodiments described above, or as will be recognized by those skilled in the art, can equally be carried by the adjacent mounting arm assemblies 824.

As also shown typically in FIG. 14, two substantially flat support plates 828 are carried by the frame 614 on opposite sides of the vacuum duct 654 relative to each other, which provide additional vertical support for the supports 660 in the upper run 626 and prevent the leakage of air through the gaps 710 between adjacent supports. Each support plate 828 extends substantially along the length of the table 612, and extends across approximately one-half the width of the table in the lengthwise direction of the supports 660 from one side of the vacuum duct to the ends of the supports. As shown typically in FIG. 14, a bearing sheet 830 is superimposed over the top surface of each support plate 828, and is attached to the respective plate in a suitable manner, such as by adhesive. The bearing sheets 828 are preferably made of a suitable plastic material having a relatively low coefficient of friction to facilitate sliding movement of the slats 662 relative to the support plates.

Each pivot mount 826 is fixedly attached to the under side of a respective support plate 828 and is spaced inwardly from the adjacent end of the upper run. As shown best in FIG. 15, each mounting arm assembly 824 has a telescopic construction, and includes a first arm 832 pivotally coupled on one end to the respective pivot mount 826, and slidably received on the other end within the hollow interior of a second arm 834 attached to the respective base 822. An open coil spring 836 is located within the hollow interior of the second arm 834, and is seated between a flange on one end of the first arm 832 and a cap 838 threadedly attached to the free end of the second arm. Each spring 836 normally biases the respective second arm and sealing strip assembly inwardly toward the exposed elongated face of the adjacent support of the upper run, as indicated typically by the arrow in FIG. 14. Each mounting arm assembly 824 also includes another open coil spring 840 coupled between the first arm 832 and the underside of the adjacent support plate 828 to normally bias the respective mounting arm upwardly toward the adjacent support plate, as indicated by the arrow in FIG. 14, and in turn bias the respective sealing strip assembly upwardly toward the adjacent gap 710.

As shown typically in FIG. 15, an actuator 842 is mounted within each base member 822 and is coupled to the control unit 646 (not shown) for driving the respective sealing strip 788 between sealing and retracted positions. In the embodiment of the invention illustrated, each actuator 842 is a pneumatic cylinder, but may equally be another type of known actuator, such as a solenoid-type actuator. Each actuator 842 includes a piston 844 coupled to the bottom edge of the respective sealing strip 788, and the sealing strip extends upwardly through a slot 846 formed through the top wall of the base member 822. Each sealing strip 788 is made of an impervious material which is sufficiently rigid to normally maintain the strip in its vertical orientation illustrated typically in FIG. 15, yet if necessary, is somewhat flexible in order to permit the strip to flex in response to vacuum forces into engagement with the exposed elongated face of the adjacent support 660 to seal the respective end portion of the vacuum bed.

The apparatus 610 also includes means for aligning each sealing strip 788 with respect to a respective gap 710 for actuating the strip upwardly into a sealing position within the gap. As shown best in FIG. 15, in the embodiment of the invention illustrated, the aligning means includes two beveled guide surfaces 848 formed on opposite sides of each base 822 relative to each other, and which are each oriented at an angle substantially matching the angle of the beveled faces 702 or 706 of the supports. As shown typically in FIG. 14, each base 822 is normally biased upwardly by the respective spring 840 toward the adjacent gap 710 so that the beveled guide surfaces 848 each slide into engagement with the adjacent elongated face 702 or 706 of the supports, and in turn align the sealing strip 788 with the gap.

In the operation of the apparatus 610, the control unit 646 (not shown) controls movement of the conveyor 616 to properly position the lay-up 618 relative to the cutter head (not shown) for performing a cutting operation. Before conveyor movement is initiated, the cylinders 842 are actuated to retract each sealing strip 788 into its retracted position, as indicated typically in broken lines in FIG. 15, to avoid interference with conveyor movement. As the upper run 626 of the conveyor moves in the longitudinal direction of the table 612, the sealing strip assemblies 768 are permitted to travel with the conveyor against the bias of the springs 836. Then, when the second arms 834 reach the end of their axial range of movement, further conveyor movement causes the beveled elongated side faces 702 or 706 of the supports to drive the base members 822 downwardly out of the path of conveyor movement. As conveyor movement continues, the base members 822 slide into and out of engagement with the side faces 702 and 706, and bottom faces of the supports. If necessary, a bearing sheet (not shown) made of a resilient material having a relatively low coefficient of friction may be attached over the beveled guide surfaces 848 to reduce or eliminate any friction between the base members and the supports.

When conveyor movement is terminated, each spring 836 biases the respective base member 822 inwardly, and each spring 840 biases the respective base member and mounting arm assembly upwardly. The beveled surfaces 848 are in turn moved into engagement with the elongated faces 702 and 706 of the adjacent supports 660 to align the sealing strips 788 with the respective gaps 710. The cylinders 842 are then actuated to drive the respective sealing strips 788 from their retracted positions within the base members 822 upwardly into their sealing positions within the adjacent gaps 710, as illustrated typically in FIG. 14. The beveled guide surfaces 848 engage the beveled side faces 702 and 706 of the supports, and in turn align the sealing strips 788 with the gaps 710 so that when located in their sealing positions, the sealing strips are in close proximity to, or in engagement with the elongated end faces of the conveyor to seal the end portions of the vacuum bed. As shown typically in FIG. 14, each sealing strip 788 extends upwardly to approximately the level of the supporting surface 638 of the conveyor when located in its sealing position to substantially cover the end portion of the vacuum bed in its vertical dimension. As described above, the sealing strips may, if necessary, be made of a somewhat flexible material, permitting the strips to flex inwardly in response to vacuum forces into sealing engagement with the bristles 668 at the end of the vacuum bed. The bearing sheets 830 and support plates 828 substantially prevent any leakage of air from beneath the table upwardly into the gaps 710 between adjacent supports in the upper run. When the cutting operation is complete, the cylinders 842 are actuated to drive the sealing strips downwardly into their retracted positions within the base members 822, as indicated typically in dashed lines in FIG. 15, to avoid interference with subsequent conveyor movement.

As will be recognized by those skilled in the pertinent art, equivalent means may be employed for biasing the sealing strip assemblies upwardly toward the gaps formed between the supports, and for biasing the sealing strip assemblies inwardly toward the central portion of the vacuum bed. Equivalent means may likewise be employed to give the first sealing strip assemblies a limited range of vertical movement and a limited range of horizontal movement, as described above. Similarly, equivalent means may be employed for guiding and aligning the sealing strip assemblies with respect to the gaps and/or end surfaces of the upper run. For example, cam-shaped surfaces may be attached to the bottoms of the slats to perform the same function.

Figure 16:
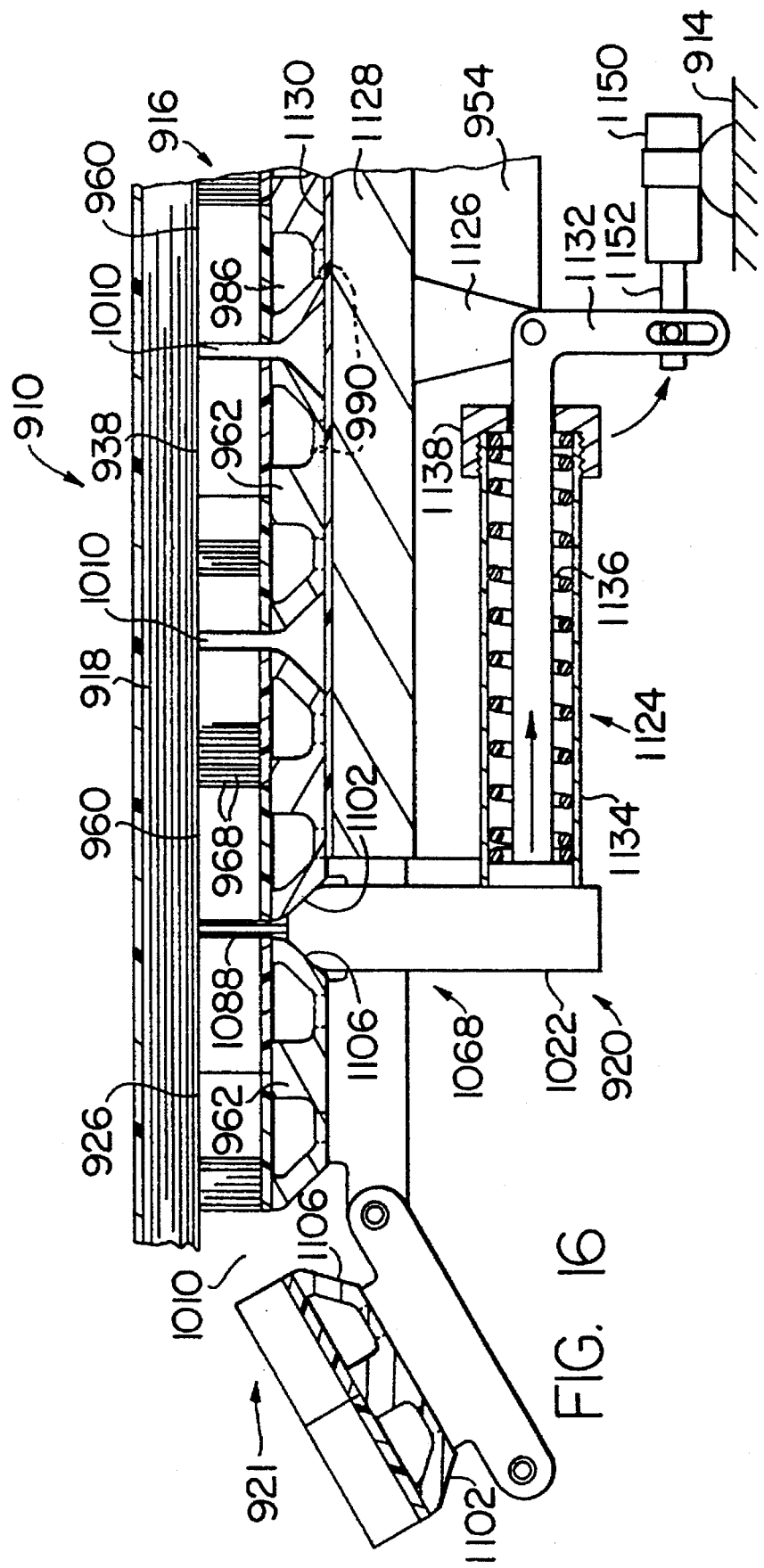
FIG. 16 is a partial, sectional view of another embodiment of the present invention like the embodiment of FIGS. 14 and 15, but also having means for actuating the sealing strip assemblies between sealing and retracted positions.

In FIG. 16, another embodiment of the present invention is indicated generally by the reference numeral 910. The elements of the apparatus 910 are designated with reference numerals between 900 and 1100, and because this embodiment of the invention is the same in many respects as the apparatus 610 described above, like reference numerals preceded by the numerals 9, 10 and 11, instead of 6, 7 and 8, respectively, are used to indicate like elements.

This embodiment of the invention is the same in most respects as the apparatus 610 described above, except that the apparatus 910 includes means for actuating each first sealing strip assembly 1068, in addition to means for actuating the sealing strip 1088 itself, between a sealing position toward a gap for aligning the respective sealing strip with the gap, and a retracted position out of the path of conveyor movement. As shown typically in FIG. 16, the first arm 1132 of each mounting arm assembly 1124 has a generally L-shaped configuration, wherein one leg of the arm is received within the hollow interior of the second arm 1134, and the other leg is coupled to an actuator for actuating the mounting arm, and thus the sealing strip assembly between sealing and retracted positions. In the embodiment of the invention illustrated, each actuator is a drive cylinder 1150 including a piston 1152 coupled to the leg of the mounting arm 1132. Each drive cylinder 1150 is coupled to the control unit (not shown) to control actuation of the cylinder, and is carried by the table frame 914 beneath the upper run 926, as illustrated typically in FIG. 16. The two second sealing strip assemblies 1090 (not shown) are each mounted between adjacent first sealing strip assemblies 1068 at a respective end of the upper run to seal the exposed apertures 990 of the slats 962. Each second sealing strip assembly is preferably carried and actuated between its sealing and retracted positions by the two adjacent mounting arm assemblies 1124 in the same or similar manner as the second sealing strip assemblies described above.

Actuation of each drive cylinder 1150 moves the respective first sealing strip assembly 1068 between a sealing position in which the respective base member 1022 is moved upwardly and aligned with the adjacent gap 1010, and a retracted position, in which the base member is moved downwardly out of the path of conveyor movement. More specifically, in the sealing position, each drive cylinder 1150 is actuated to pivot the respective arm 1132 upwardly, as indicated by the arrows in FIG. 16, which in turn moves the beveled guide surfaces 1148 of the respective base member 1022 into engagement with the elongated faces 1002 and 1006 of the adjacent supports 960, and aligns the respective sealing strip 1088 with the gap 1010. The cylinders (not shown) within the base members 1022 are then actuated to drive the sealing strips 1088 upwardly into their sealing positions, as shown typically in FIG. 16, to seal the engaged end portions of the vacuum bed. When a cutting operation is complete, the cylinders within the base members 1022 are actuated to retract the sealing strips into their retracted positions, and the drive cylinders 1150 are actuated to pivot the arms 1132 downwardly, and in turn move the sealing strip assemblies out of the path of conveyor movement.

Turning to FIG. 17, another embodiment of the present invention is indicated generally by the reference numeral 1210. The elements of the apparatus 1210 are designated with reference numerals between 1200 and 1500, and because this embodiment of the invention is the same in many respects as the apparatus 610 described above, like reference numerals preceded by the numerals 12, 13 and 14, instead of 6, 7 and 8, respectively, are used to indicate like elements.

The apparatus 1210 differs from the apparatus 610 described above in that the sealing strips 1388 are not carried by movable base members and mounting arms, but rather the base or guide members 1422 are stationary. The sealing strips 1388 are in turn sufficiently flexible so that the guide surfaces 1302 and/or 1306 of the supports 1260 can guide the strips 1388 into the gaps without the need for horizontal movement of the sealing strip assemblies. As shown typically in FIG. 17, each base member 1422 defines a generally L-shaped configuration in cross-section, and a curved guide slot 1446 extending through the base. Each sealing strip 1388 is received through the guide slots 1446 of the respective base members, and is made of an impervious material, such as a suitable plastic or the like, which is sufficiently flexible to permit the sealing strips to bend when received through the curved slots, yet is sufficiently rigid to prevent the strips from bending under their own weight when vertically oriented in the gaps 1310, as illustrated typically in FIG. 17.

The bottom edge of each sealing strip is coupled to at least two actuators, each associated with a respective base member 1422, for actuating the strip between a sealing position within the adjacent gap 1310 to seal the end portions of the vacuum bed, and a retracted position out of the path of conveyor movement. Although numerous types of actuators may be employed, in this embodiment of the invention each actuator is a pneumatic cylinder 1442, including a piston 1444 coupled to the bottom edge of the respective sealing strip. The cylinders 1442 and base members 1422 are carried by the table frame 1214, and each cylinder is coupled to the control unit (not shown) to control actuation of the cylinders, and thus movement of the sealing strips between their sealing and retracted positions.

Actuation of each piston 1444 out of its cylinder 1442 drives the respective sealing strip 1388 upwardly into a sealing position within the adjacent gap 1310, as illustrated typically in FIG. 17. If the sealing strip and respective gap are not perfectly aligned with each other, the strip engages the beveled elongated faces 1302 and/or 1306 of the adjacent supports, which in turn guide the strip into the gap. Each sealing strip is sufficiently flexible to permit the vacuum forces acting through the bristles 1268 to pull the strip inwardly into engagement with the exposed bristles to seal the end portions of the vacuum bed. When a cutting operation is complete, each cylinder 1442 is actuated to drive its piston inwardly, which in turn drives the respective sealing strip 1388 downwardly through the guide slots 1446 into its retracted position out of the path of conveyor movement. As shown typically in FIG. 17, each support plate 1428 and corresponding bearing sheet 1430 extends in the longitudinal direction of the table beyond each end of the vacuum duct 1254 at least approximately as far as the inside face of each base member 1422, to seal the apertures 1290 of the supports engaged by the sealing strips 1388.

In each of the embodiments of the present invention illustrated in FIGS. 14–17, the supports of the conveyor may also include co-engageable parts which engage one another when the supports form a part of the upper run to prevent relative vertical displacement of adjacent supports. For example, in FIG. 18 a typical support 1260 forming a part of the apparatus 1210 is illustrated, which includes wedge-shaped tongues and grooves for preventing such relative vertical displacement and maintaining substantially uniform spacing within the gaps 1310 between supports. Each slat 1262 includes several tongues 1300 (only one shown) formed on the upper portion of the elongated side face 1302, and several corresponding grooves 1304 formed in the upper portion of the opposite elongated side face 1306. The tongues 1300 and grooves 1304 do not extend along the entire elongated side faces, but rather each extends over a short portion of the respective side face to avoid interfering with movement of the sealing strips 1388 within the gaps 1310. The sealing strips 1388 preferably include corresponding cut-out portions, such as slots (not shown), to receive the tongues and grooves when actuated into the sealing position. As two adjacent supports 1260 move over one of the rotatable end units into the upper run, their adjacent tongues and corresponding grooves move into gradual engagement with one another in order to maintain the supports in proper vertical relationship and maintain substantially uniform spacing throughout the gaps 1310 between adjacent supports.

Although the present invention has been described above with reference to certain specific embodiments, numerous modifications may be made to these embodiments without departing from the scope of the invention as defined in the appended claims. For example, it may be desirable to use a different drive or biasing mechanisms for controlling movement of the first and second sealing strip assemblies between their sealing and retracted positions. It may likewise be desirable to employ a different structure and/or drive mechanism for aligning the sealing assemblies with the gaps in the conveyor. This detailed description of preferred embodiments is therefore to be viewed in an illustrative, rather than in a limiting sense.

What is claimed is:

1. An apparatus for cutting sheet material, comprising:

a frame;

a cutting unit movable relative to the frame to cut the sheet material;

an endless conveyor including a plurality of elongated supports arranged in succession relative to each other and coupled together, each support defining elongated faces on substantially opposite sides of the support relative to each other, each elongated face extending in the elongated direction of the respective support, each support further including a permeable layer extending between the elongated faces and forming a permeable portion on each elongated face extending from approximately one end of the support to another end in the elongated direction of the support, the permeable layers of a plurality of the supports forming a permeable support surface for supporting the sheet material;

two rotatable units supported by the frame and spaced relative to each other, each rotatable unit being coupled to the conveyor for guiding the conveyor along a path in a direction substantially transverse to the elongated direction of the supports, the conveyor defining an upper run including the support surface for supporting the sheet material, a lower run spaced below the upper run, two end sections, each end section extending between the upper run and the lower run, and being located adjacent to a respective rotatable unit, and a gap formed between exposed, opposing elongated faces of two supports located adjacent to each other at one end of the upper run;

a vacuum unit coupled in fluid communication with a plurality of the supports in the upper run for drawing a vacuum through the permeable layers of the respective supports to facilitate holding the sheet material against the support surface;

an actuating unit located beneath the upper run and movable relative to the conveyor; and a sealing member pivotally coupled to the actuating unit for pivotal movement of the sealing member relative to the actuating unit, the sealing member extending in the elongated direction of the supports and being movable by the actuating unit upwardly within the gap into a sealing position in engagement with the permeable portion of an elongated face of one of the supports of the upper run forming the gap and sealing the engaged face, and the sealing member being movable by the actuating unit downwardly into a retracted position away from the gap and out of the path of conveyor movement.

2. An apparatus as defined in claim 1, further comprising means for normally biasing the sealing member toward the elongated face.

3. An apparatus as defined in claim 2, wherein the means for biasing includes a spring coupled between the sealing member and the actuating unit.

4. An apparatus as defined in claim 1, further comprising means for moving the sealing member in a direction substantially transverse to the elongated direction of the supports to align the sealing member with the gap.

5. An apparatus as defined in claim 4, wherein the means for moving includes a guide rail extending in a direction substantially transverse to the elongated direction of the supports, and the actuating unit is carried on the guide rail for movement of the actuating unit and sealing member transverse to the elongated direction of the supports.

6. An apparatus as defined in claim 5, further comprising two actuating units coupled to the sealing member, and two guide rails, each guide rail carrying a respective actuating unit, and wherein the means for moving further includes a drive frame coupled to the actuating units, and a drive unit coupled to the drive frame for moving the actuating units and sealing member on the guide rail.

7. An apparatus as defined in claim 5, further comprising a drive unit coupled to the actuating unit for moving the actuating unit and sealing member on the guide rail; a control unit coupled to the drive unit to control operation of the drive unit; and a sensor mounted adjacent to the gap for transmitting signals to the control unit indicative of the position of the sealing member relative to the gap, the control unit being responsive to the signals transmitted by the sensor to control operation of the drive unit to align the sealing member with the gap.

8. An apparatus as defined in claim 1, wherein the conveyor defines a plurality of gaps between the elongated faces of adjacent supports, and the apparatus further comprises at least one support plate carried by the frame beneath the upper run, and extending in a direction substantially transverse to the elongated direction of the supports for sealing a plurality of the gaps in the upper run.

9. An apparatus as defined in claim 1, wherein each of a plurality of the supports defines a base surface on a substantially opposite side of the support relative to the permeable layer, and each base surface defines at least one aperture adapted to be coupled in communication between the permeable layer and the vacuum unit for the passage of air from the permeable layer through the aperture and into the vacuum unit; and the apparatus further comprises a second actuating unit located beneath the upper run and movable relative to the conveyor; and a second sealing member coupled to the second actuating unit, wherein the second sealing member is movable by the second actuating unit upwardly into a sealing position in engagement with an exposed base surface of a support located at approximately one end of the upper run to seal the at least one aperture of the respective support, and the second sealing member is movable by the second actuating unit downwardly into a retracted position away from the base surface of the respective support out of the path of conveyor movement.

10. An apparatus as defined in claim 1, wherein the conveyor defines two gaps located on substantially opposite ends of the upper run relative to each other, each gap being defined between exposed, elongated faces of two supports located adjacent to each other, and wherein the apparatus comprises two actuating units, each actuating unit being located beneath the upper run adjacent to a respective gap, and two sealing members, each being carried by a respective actuating unit.

11. An apparatus as defined in claim 1, wherein the conveyor defines a plurality of gaps between adjacent supports in the upper run, and a plurality of opposing elongated faces of adjacent supports include tongue portions and corresponding engageable grooves receiving the tongue portions when located in the upper run and substantially preventing relative vertical displacement of adjacent supports, the tongue portions of each support being spaced relative to each other in the elongated direction of the support.

12. An apparatus for cutting sheet material, comprising:
a frame;
a cutting unit movable relative to the frame to cut the sheet material;
an endless conveyor including a plurality of elongated supports arranged in succession relative to each other and coupled together, each support defining elongated faces on substantially opposite sides of the support relative to each other, each elongated face extending in the elongated direction of the respective support, each support further including a permeable layer extending between the elongated faces and forming a permeable portion on each elongated face extending from approximately one end of the support to another end in the elongated direction of the support, the permeable layers of a plurality of the supports forming a permeable support surface for supporting the sheet material;
two rotatable units supported by the frame and spaced relative to each other, each rotatable unit being coupled to the conveyor for guiding the conveyor along a path in a direction substantially transverse to the elongated direction of the supports, the conveyor defining an upper run including the support surface for supporting the sheet material, a lower run spaced below the upper run, two end sections, each end section extending between the upper run and the lower run, and being located adjacent to a respective rotatable unit, and a gap formed between exposed, opposing elongated faces of two supports located adjacent to each other at one end of the upper run;
a vacuum unit coupled in fluid communication with a plurality of the supports in the upper run for drawing a vacuum through the permeable layers of the respective supports to facilitate holding the sheet material against the support surface;
an actuating unit located beneath the upper run; and
a sealing member coupled to the actuating unit and extending in the elongated direction of the supports, the sealing member being movable by the actuating unit upwardly within the gap into a sealing position in engagement with the permeable portion of an elongated face of one of the supports of the upper run forming the gap and sealing the engaged face, and the sealing member being movable by the actuating unit downwardly into a retracted position away from the gap and out of the path of conveyor movement;
wherein the actuating unit includes an actuating arm coupled to the sealing member, and a drive member coupled to the actuating arm for driving the arm and sealing member between the sealing and retracted positions; and the actuating arm includes a first leg, a second leg, and a pivotal mount coupled to one of the first and second legs, and the drive member is coupled co the first leg, and the sealing member is carried by the second leg, whereupon movement of the first leg by the drive member in a first direction pivots the second leg and sealing member upwardly into the sealing position, and movement of the first leg by the drive member in a second direction pivots the second leg and sealing member downwardly into the retracted position.

13. An apparatus for cutting sheet material, comprising:

a frame;

a cutting unit movable relative to the frame to cut the sheet material;

an endless conveyor including a plurality of elongated supports arranged in succession relative to each other and coupled together, each support defining elongated faces on substantially opposite sides of the support relative to each other, each elongated face extending in the elongated direction of the respective support, each support further including a permeable layer extending between the elongated faces and forming a permeable portion on each elongated face extending from approximately one end of the support to another end in the elongated direction of the support, the permeable layers of a plurality of the supports forming a permeable support surface for supporting the sheet material;

two rotatable units supported by the frame and spaced relative to each other, each rotatable unit being coupled to the conveyor for guiding the conveyor along a path in a direction substantially transverse to the elongated direction of the supports, the conveyor defining an upper run including the support surface for supporting the sheet material, a lower run spaced below the upper run, two end sections, each end section extending between the upper run and the lower run, and being located adjacent to a respective rotatable unit, and a gap formed between exposed, opposing elongated faces of two supports located adjacent to each other at one end of the upper run;

a vacuum unit coupled in fluid communication with a plurality of the supports in the upper run for drawing a vacuum through the permeable layers of the respective supports to facilitate holding the sheet material against the support surface;

an actuating unit located beneath the upper run;

a sealing member coupled to the actuating unit and extending in the elongated direction of the supports, the sealing member being movable by the actuating unit upwardly within the gap into a sealing position in engagement with the permeable portion of an elongated face of one of the supports of the upper run forming the gap to seal the engaged face, and the sealing member being movable by the actuating unit downwardly into a retracted position away from the gap and out of the path of conveyor movement; and a backing plate coupled to the actuating unit and extending substantially in the elongated direction of the supports, wherein a first portion of the sealing member adjacent to an edge extending in the elongated direction of the supports is secured to the backing plate, and a second portion of the sealing member is movable relative to the backing plate into engagement with the engaged face of the support.

14. An apparatus for cutting sheet material, comprising:

a frame;

a cutting unit movable relative to the frame to cut the sheet material;

an endless conveyor including a plurality of elongated supports arranged in succession relative to each other and coupled together, each support defining elongated faces on substantially opposite sides of the support relative to each other, each elongated face extending in the elongated direction of the respective support, each support further including a permeable layer extending between the elongated faces and forming a permeable portion on each elongated face extending from approximately one end of the support to another end in the elongated direction of the support, the permeable layers of a plurality of the supports forming a permeable support surface for supporting the sheet material;

two rotatable units supported by the frame and spaced relative to each other, each rotatable unit being coupled to the conveyor for guiding the conveyor along a path in a direction substantially transverse to the elongated direction of the supports, the conveyor defining an upper run including the support surface for supporting the sheet material, a lower run spaced below the upper run, two end sections, each end section extending between the upper run and the lower run, and being located adjacent to a respective rotatable unit, and a gap formed between exposed, opposing elongated faces of two supports located adjacent to each other at one end of the upper run;

a vacuum unit coupled in fluid communication with a plurality of the supports in the upper run for drawing a vacuum through the permeable layers of the respective supports to facilitate holding the sheet material against the support surface;

an actuating unit located beneath the upper run;

a sealing member coupled to the actuating unit and extending in the elongated direction of the supports, the sealing member being movable by the actuating unit upwardly within the gap into a sealing position for engaging the permeable portion of an elongated face of one of the supports of the upper run forming the gap and sealing the engaged face, and the sealing member being movable by the actuating unit downwardly into a retracted position away from the gap and out of the path of conveyor movement; and means for biasing the sealing member generally toward the engaged face.

15. An apparatus as defined in claim 14, further comprising a mounting arm coupled to the sealing member, and wherein the means for biasing includes a spring coupled to the mounting arm for normally biasing the mounting arm and sealing member.

16. An apparatus as defined in claim 15, wherein the mounting arm includes a first arm portion defining a hollow interior, and a second arm portion received within the hollow interior of the first arm portion, and wherein the spring is coupled between the first and second arm portions.

17. An apparatus as defined in claim 14, further comprising means for normally biasing the sealing member in an upward direction substantially toward the gap.

18. An apparatus as defined in claim 17, further comprising a mounting arm coupled to the sealing member, and the means for biasing includes a spring coupled to the mounting arm for biasing the mounting arm and sealing member upwardly.

19. An apparatus for conveying sheet material, comprising:

a conveyor including a plurality of elongated supports coupled together in succession, each support including an elongated base portion and a permeable layer coupled to one side of the base portion, and defining elongated faces extending in the elongated direction of the support on opposite sides of the support relative to each other, each elongated face including a permeable portion formed by the permeable layer of the support and extending from approximately one end of the support to another end in the elongated direction of the support, the permeable layers of a plurality of the supports forming a permeable supporting surface for supporting the sheet material;

two rotatable units located on substantially opposite sides of the supporting surface relative to each other and coupled to the conveyor for guiding the conveyor along a path of movement substantially transverse to the elongated direction of the supports, the conveyor defining an upper run extending between the rotatable units, and at least two gaps, each gap being located at a respective end of the upper run and defined between exposed elongated faces of two of the supports located adjacent to each other;

first means extending in the elongated direction of the supports and mounted beneath the upper run adjacent to one of the gaps for engaging in a sealing position the permeable portion of one of the elongated faces forming said gap for sealing the respective end of the upper run;

second means for actuating the first means between said sealing position and a retracted position below said gap away from the path of conveyor movement; and a backing member coupled to the second means and extending approximately in the elongated direction of the supports, wherein a first portion of the first means adjacent to an edge of the first means extending in the elongated direction of the supports is secured to the backing member, and a second portion of the first means is movable relative to the backing member into engagement with the engaged face.

20. An apparatus as defined in claim 19, further comprising means for drawing a vacuum through the permeable layers of the supports for holding the sheet material on the supporting surface, wherein the elongated base portion of each support defines an aperture on a substantially opposite side of the base portion relative to the permeable layer and adapted to be coupled in communication between the permeable layer and the vacuum means for passage of air from the permeable layer through the aperture and into the vacuum means, and wherein the apparatus further includes a sealing member, and an actuating unit coupled to the sealing member, the sealing member being movable by the actuating unit between a sealing position, wherein the sealing member covers the aperture in the base portion of a support located at approximately one end of the upper run to seal the aperture, and a retracted position, wherein the sealing member is located below the conveyor out of the path of conveyor movement.

21. An apparatus for conveying sheet material, comprising:

a conveyor including a plurality of elongated supports coupled together in succession, each support including an elongated base portion and a permeable layer coupled to one side of the base portion, and defining elongated faces extending in the elongated direction of the support on opposite sides of the support relative to each other, each elongated face including a permeable portion formed by the permeable layer of the support and extending from approximately one end of the support to another end in the elongated direction of the support, the permeable layers of a plurality of the supports forming a permeable supporting surface for supporting the sheet material;

two rotatable units located on substantially opposite sides of the supporting surface relative to each other and coupled to the conveyor for guiding the conveyor along a path of movement substantially transverse to the elongated direction of the supports, the conveyor defining an upper run extending between the rotatable units, and at least two gaps, each gap being located at a respective end of the upper run and defined between exposed elongated faces of two of the supports located adjacent to each other;

first means extending in the elongated direction of the supports and mounted beneath the upper run adjacent to one of the gaps for engaging in a sealing position the permeable portion of one of the elongated faces forming said gap for sealing the respective end of the upper run;

second means for actuating the first means between said sealing position and a retracted position below said gap away from the path of conveyor movement; and third means for biasing the first means toward the engaged face.

22. An apparatus as defined in claim 21, wherein the first means includes a sealing member extending substantially in the elongated direction of the supports, the second means includes a mounting arm carrying the sealing member, and the third means includes a spring biasing at least a portion of the mounting arm, and in turn biasing the sealing member toward the engaged face.

23. An apparatus as defined in claim 22, wherein the mounting arm includes a first arm portion defining a hollow interior portion, and a second arm portion received within the hollow interior portion, and the spring is coupled between the first and second arm portions.

24. An apparatus as defined in claim 21, further comprising fourth means for normally biasing the first means upwardly and generally toward the gap.

25. An apparatus as defined in claim 24, wherein the first means includes a sealing member extending substantially in the elongated direction of the supports, the second means includes a mounting arm carrying the sealing member, and the fourth means includes a spring biasing at least a portion of the mounting arm upwardly.

26. An apparatus as defined in claim 21, further comprising at least one guide surface formed on the elongated face of each of the plurality of supports, each guide surface being shaped to guide the first means into the gap upon movement of the first means into the sealing position.

27. An apparatus as defined in claim 21, further comprising a plurality of first guide surfaces, each first guide surface being formed on the elongated face of a respective support, and at least one second guide surface coupled to the first means and defining a contour substantially conforming to a contour of at least one first guide surface, the second guide surface being engageable with an adjacent first guide surface upon movement of the first means toward the sealing position to align the first means with the gap.

\* \* \* \* \*